April 1, 1952 R. L. LORENZ 2,591,448
ELAPSED TIME RECORDER
Filed Sept. 2, 1947 20 Sheets-Sheet 1
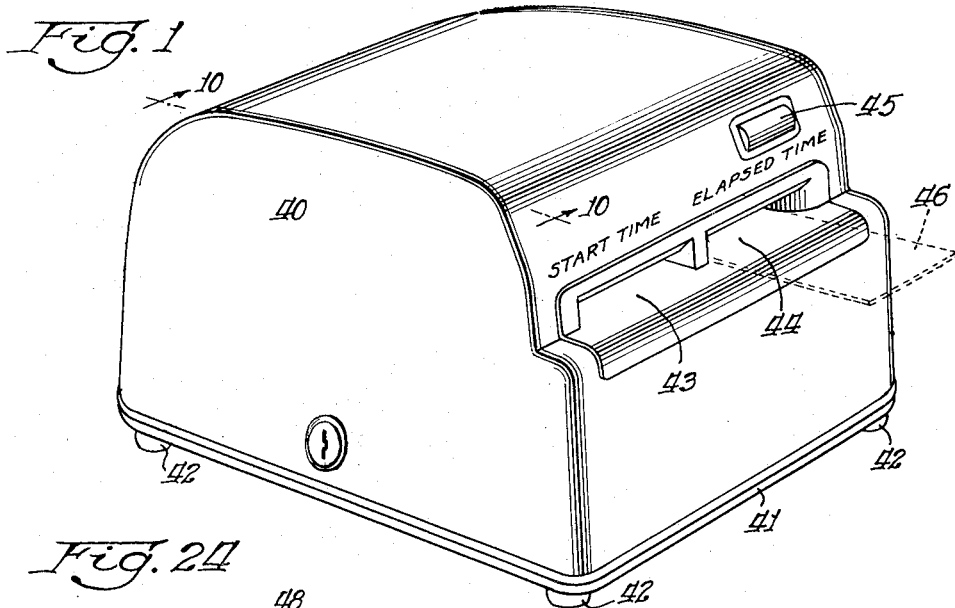
Fig. 1
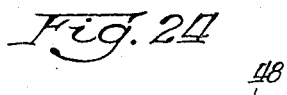
Fig. 24
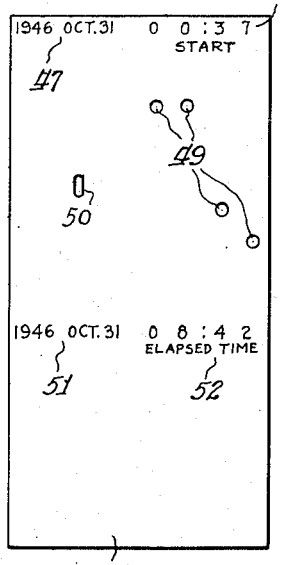
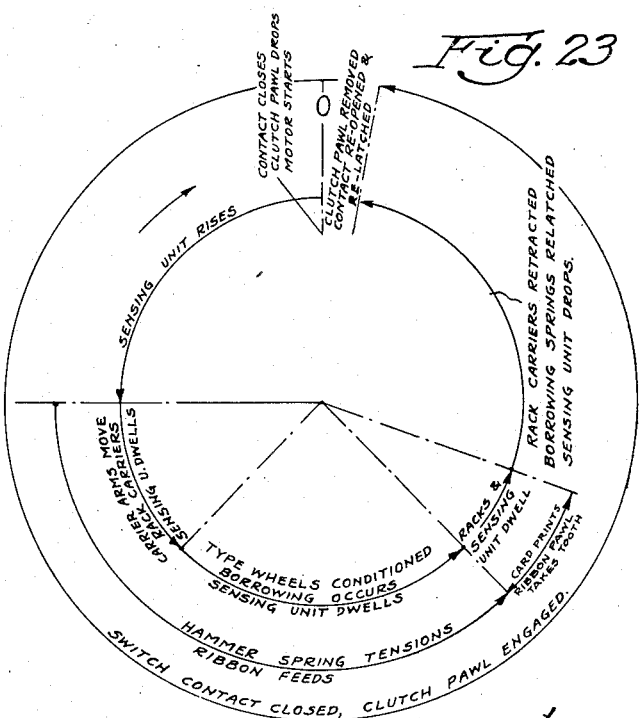
Fig. 23
Inventor:
Richard L. Lorenz
By: Richard E. Burn
Atty.

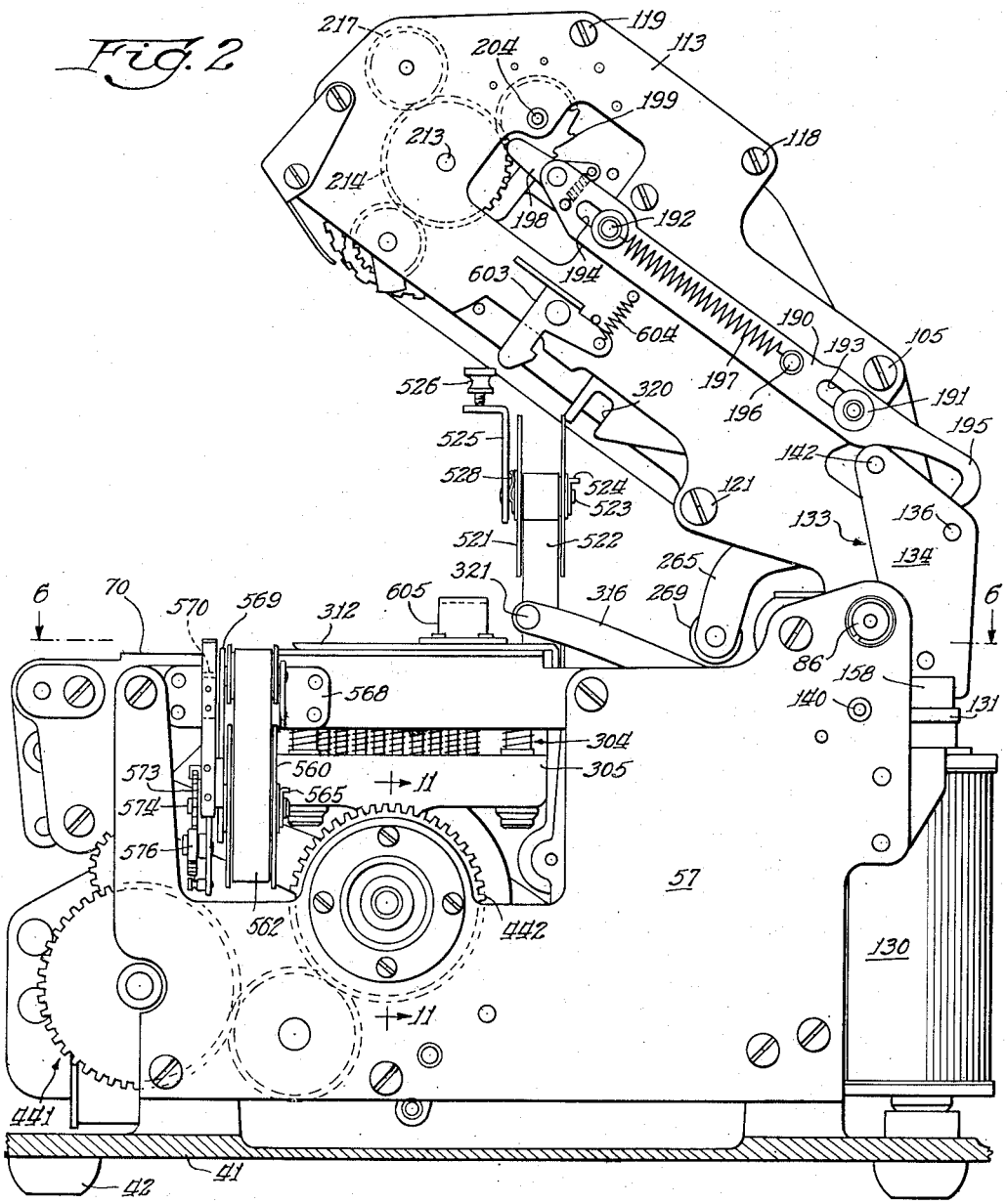

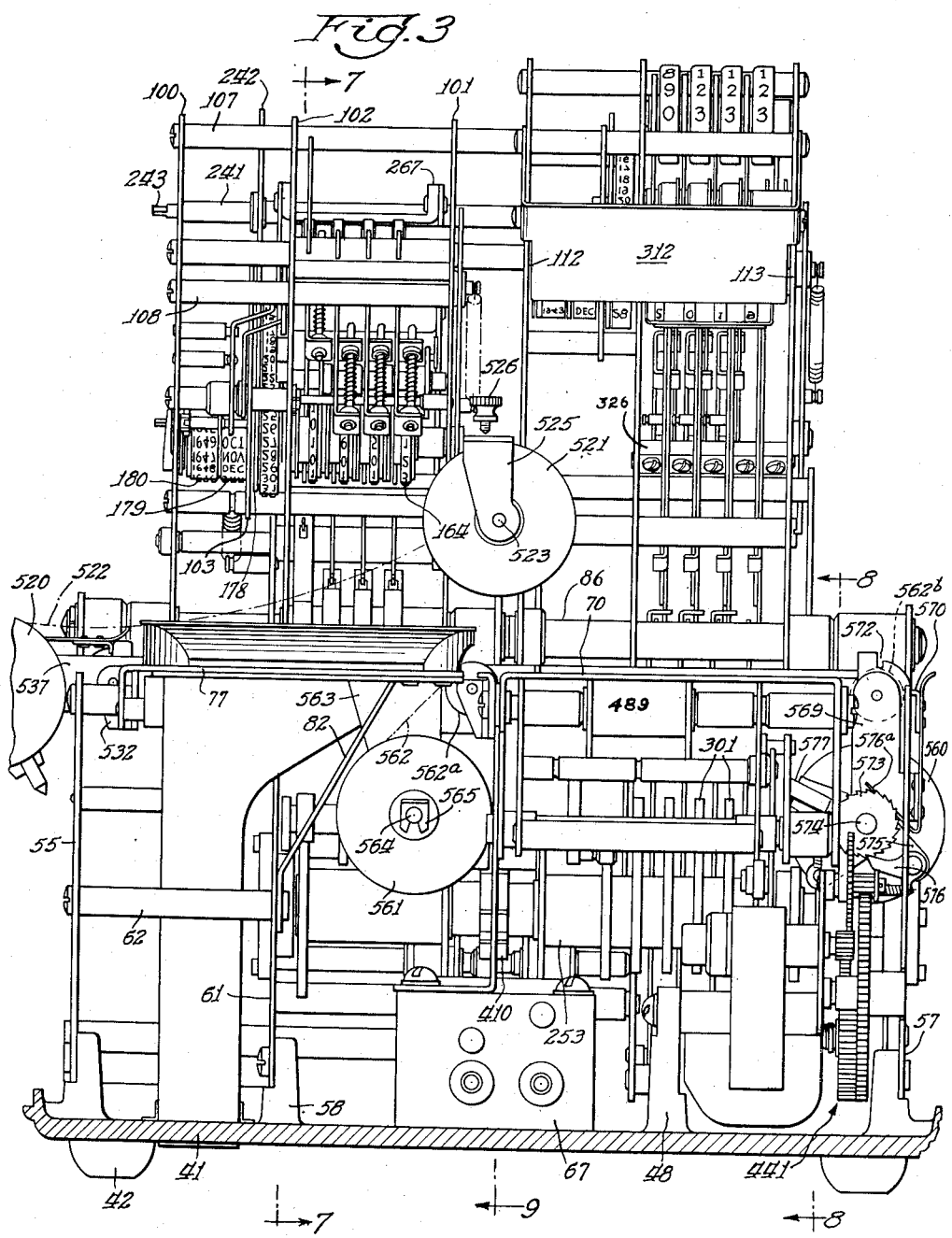

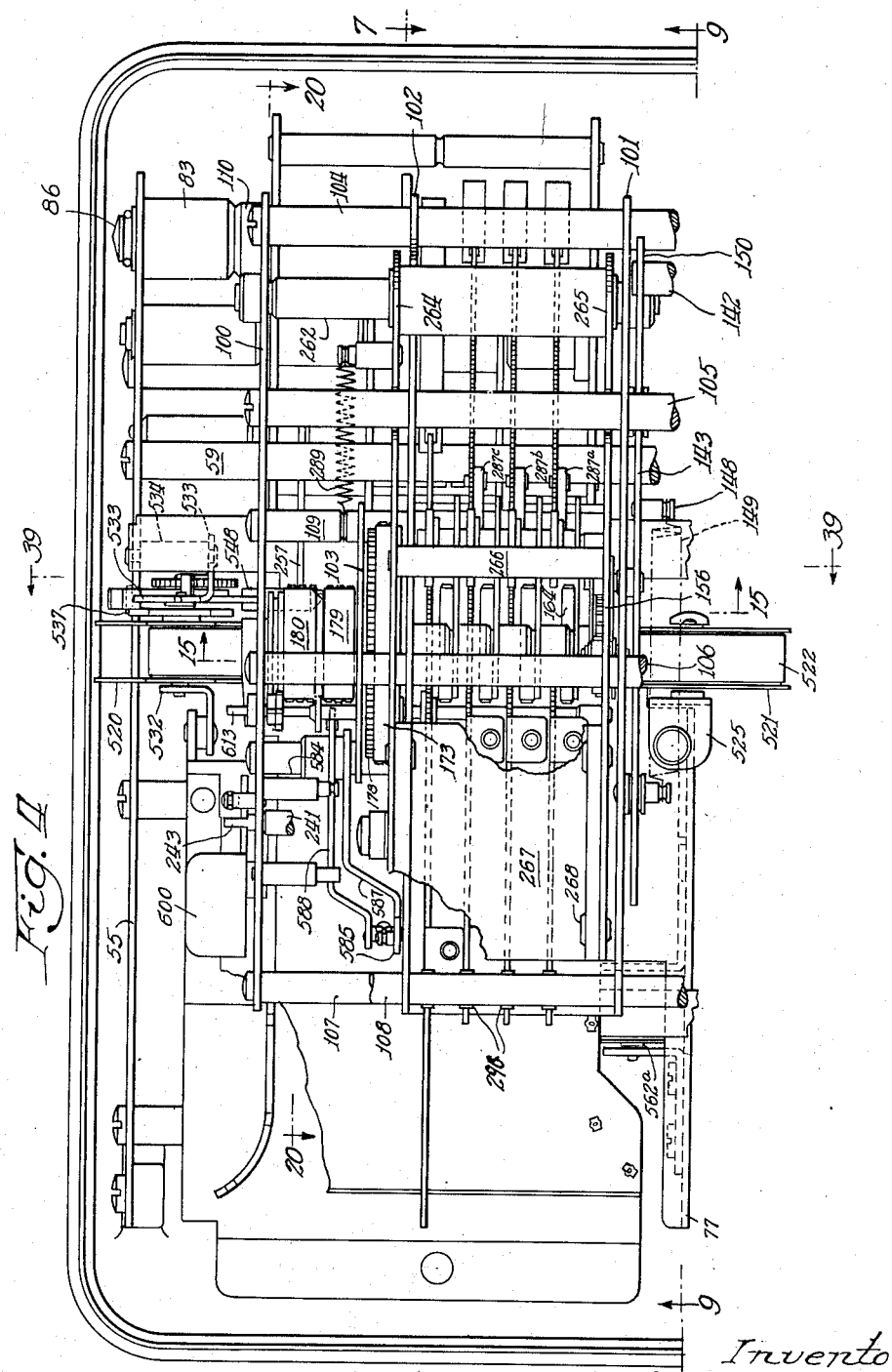

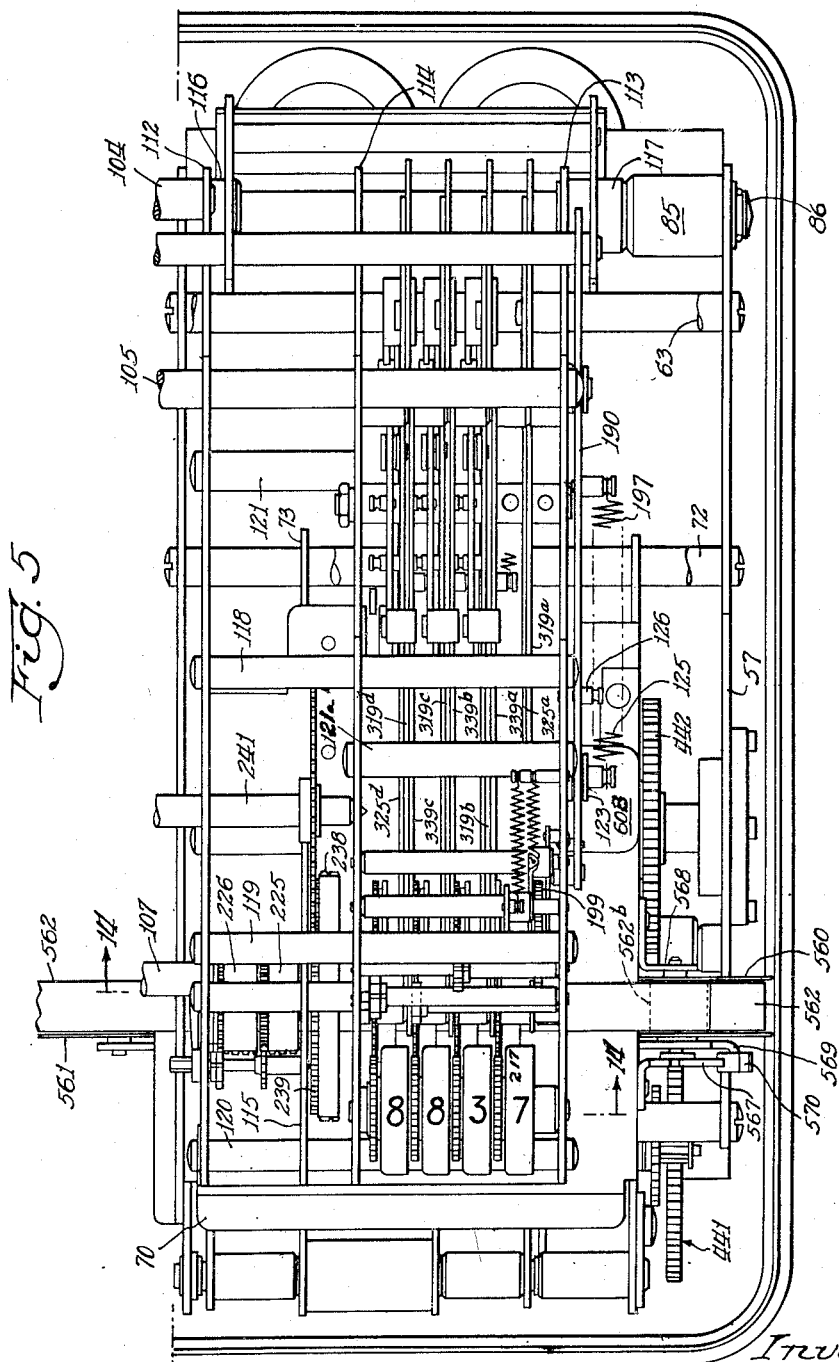

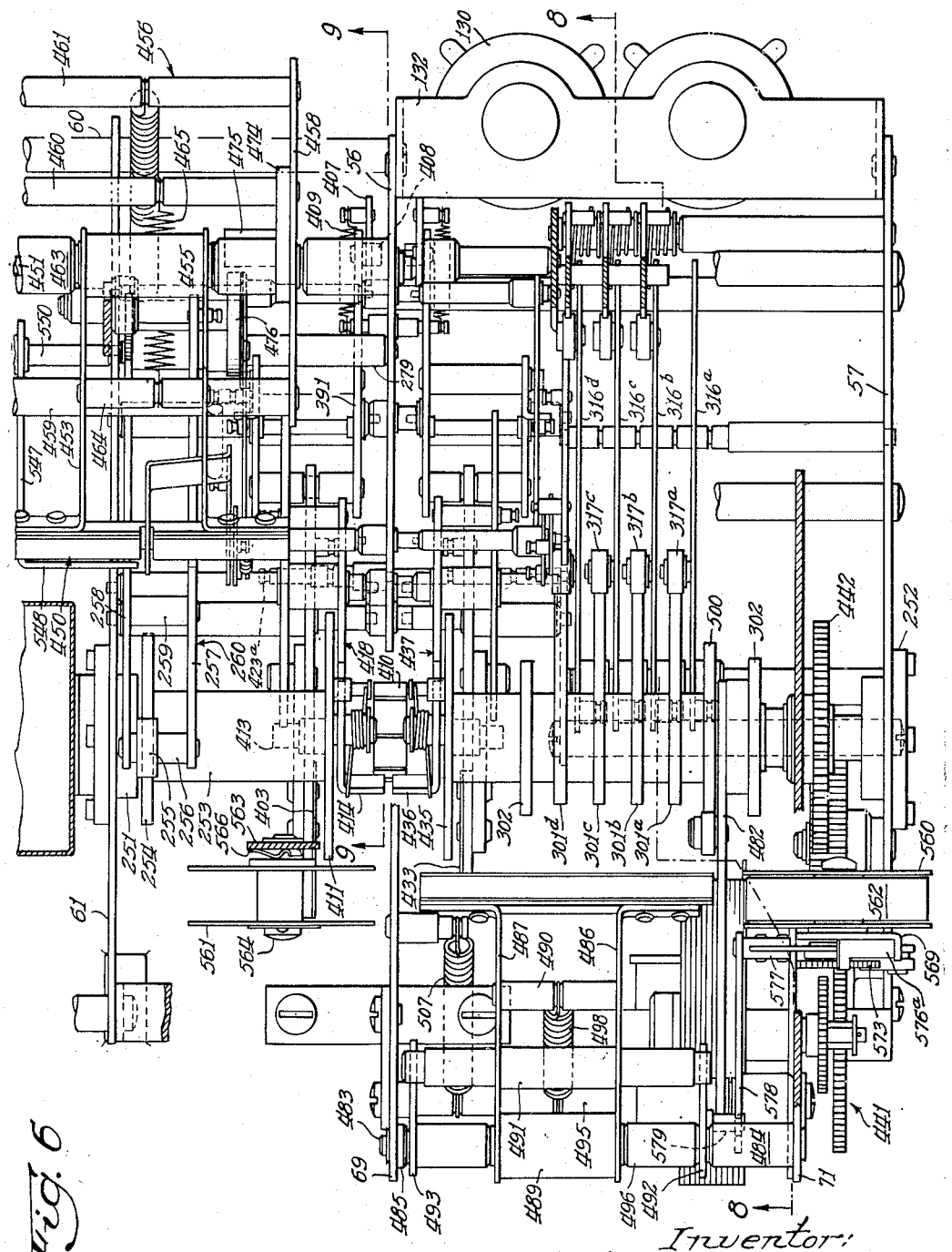

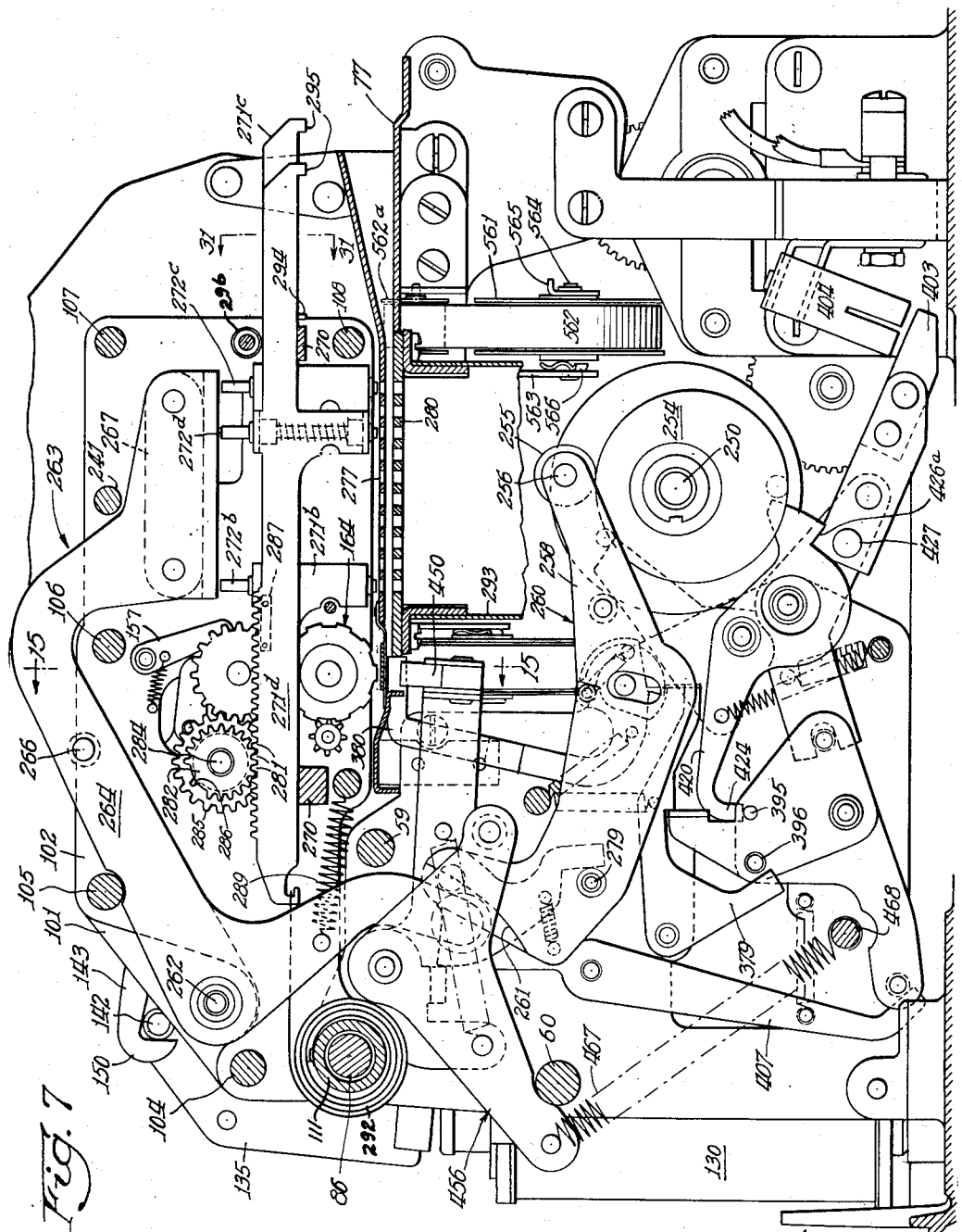

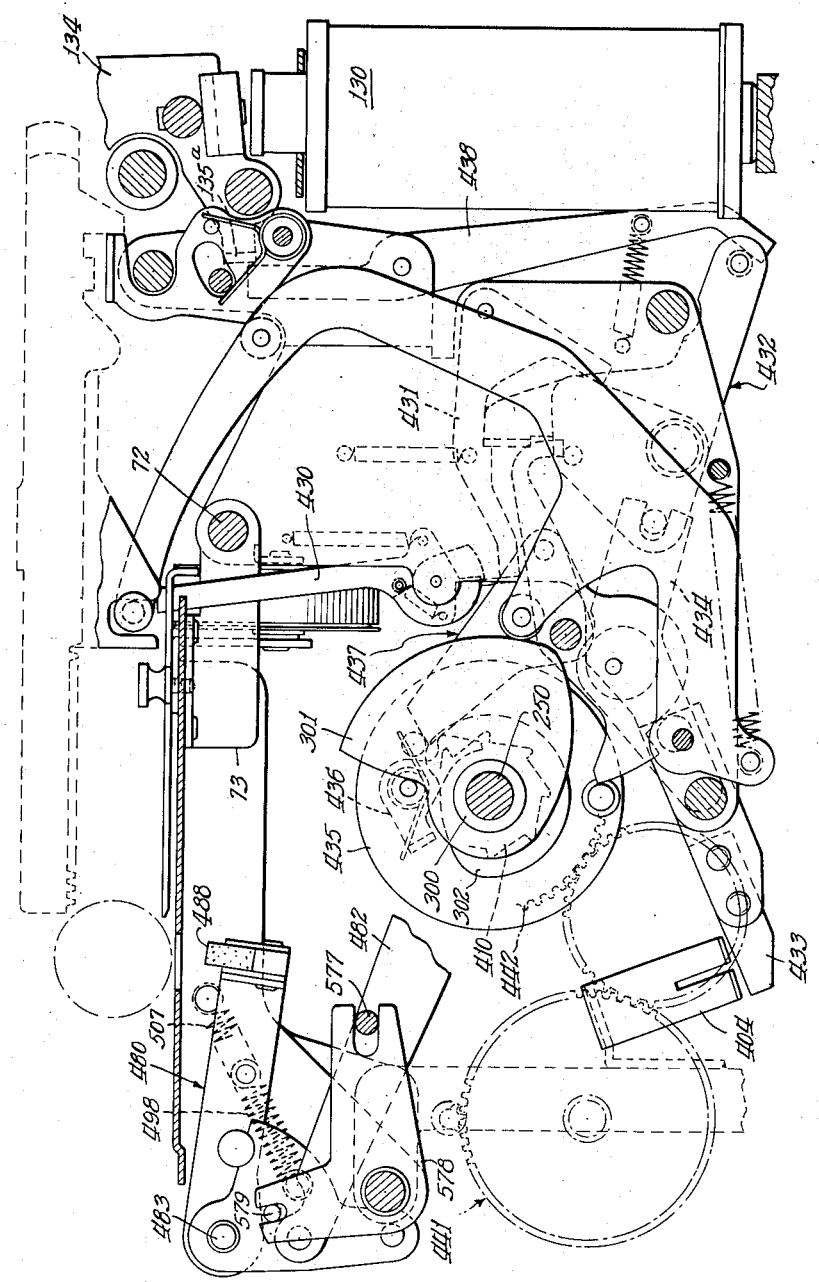

April 1, 1952 R. L. LORENZ 2,591,448
ELAPSED TIME RECORDER
Filed Sept. 2, 1947 20 Sheets-Sheet 9

Inventor:
Richard L. Lorenz
By: Richard E. Burn
Atty

April 1, 1952
R. L. LORENZ
2,591,448
ELAPSED TIME RECORDER
Filed Sept. 2, 1947
20 Sheets-Sheet 10
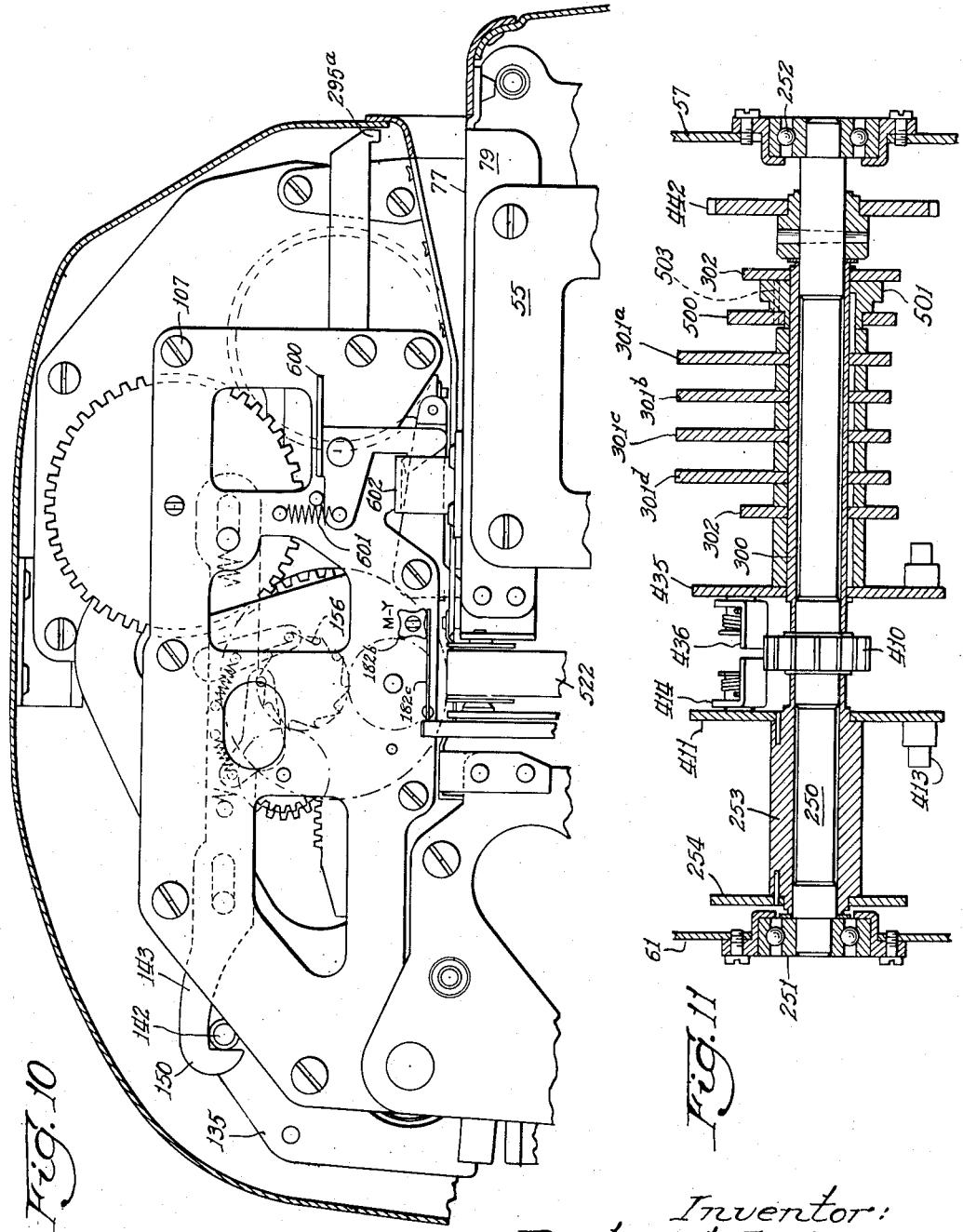
Inventor:
Richard L. Lorenz
By: Richard E. Burn
Atty.

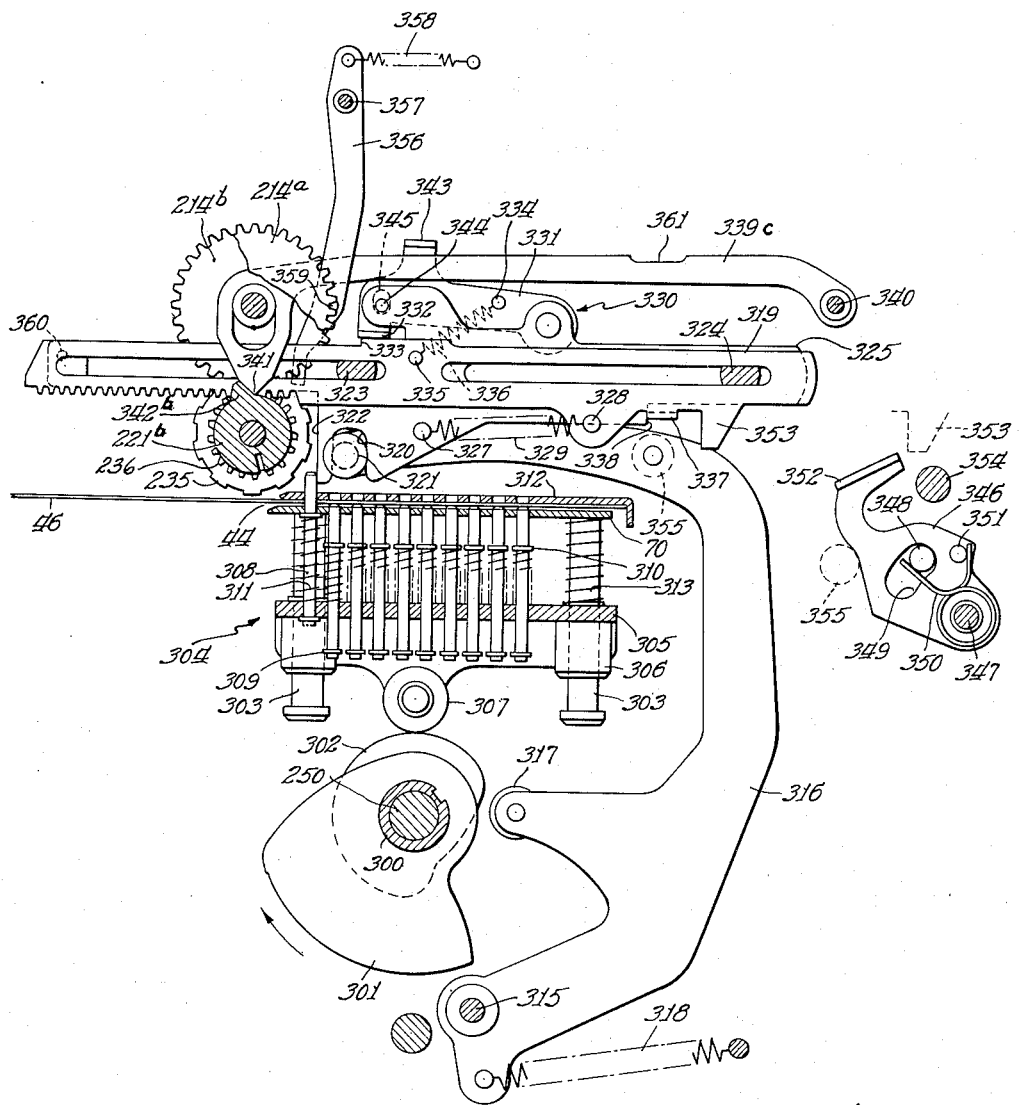

April 1, 1952  R. L. LORENZ  2,591,448
ELAPSED TIME RECORDER
Filed Sept. 2, 1947  20 Sheets-Sheet 13
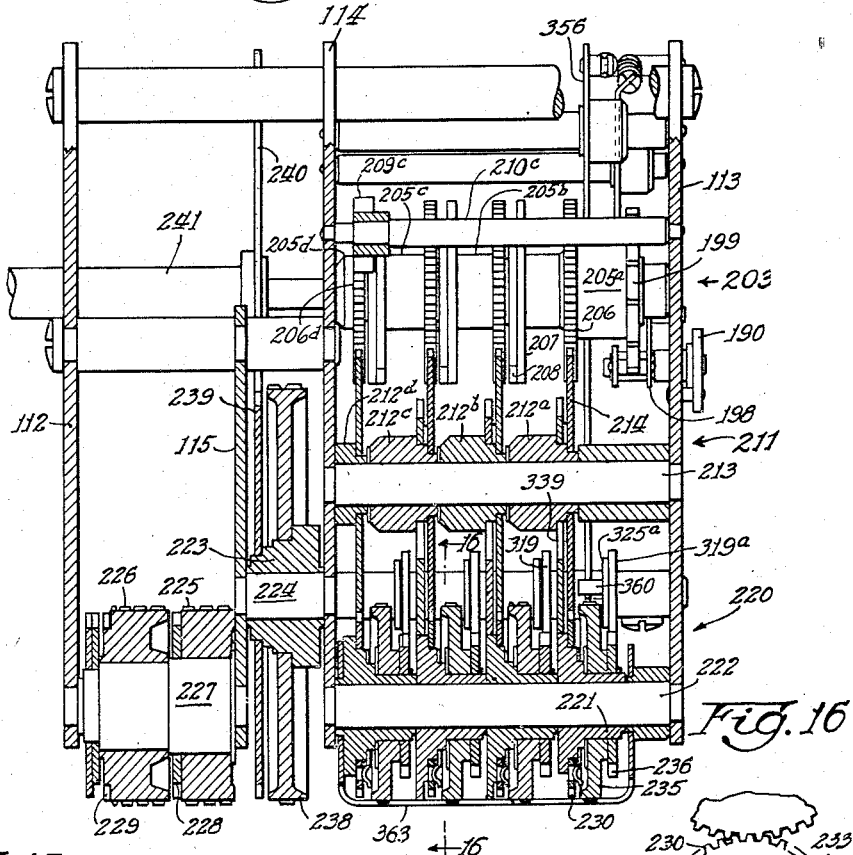
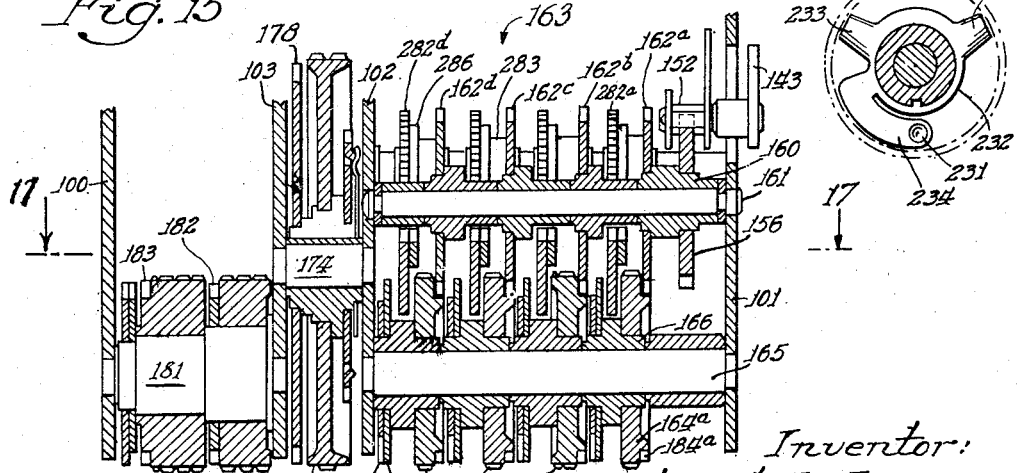
Inventor:
Richard L. Lorenz
By: Richard E. Burr

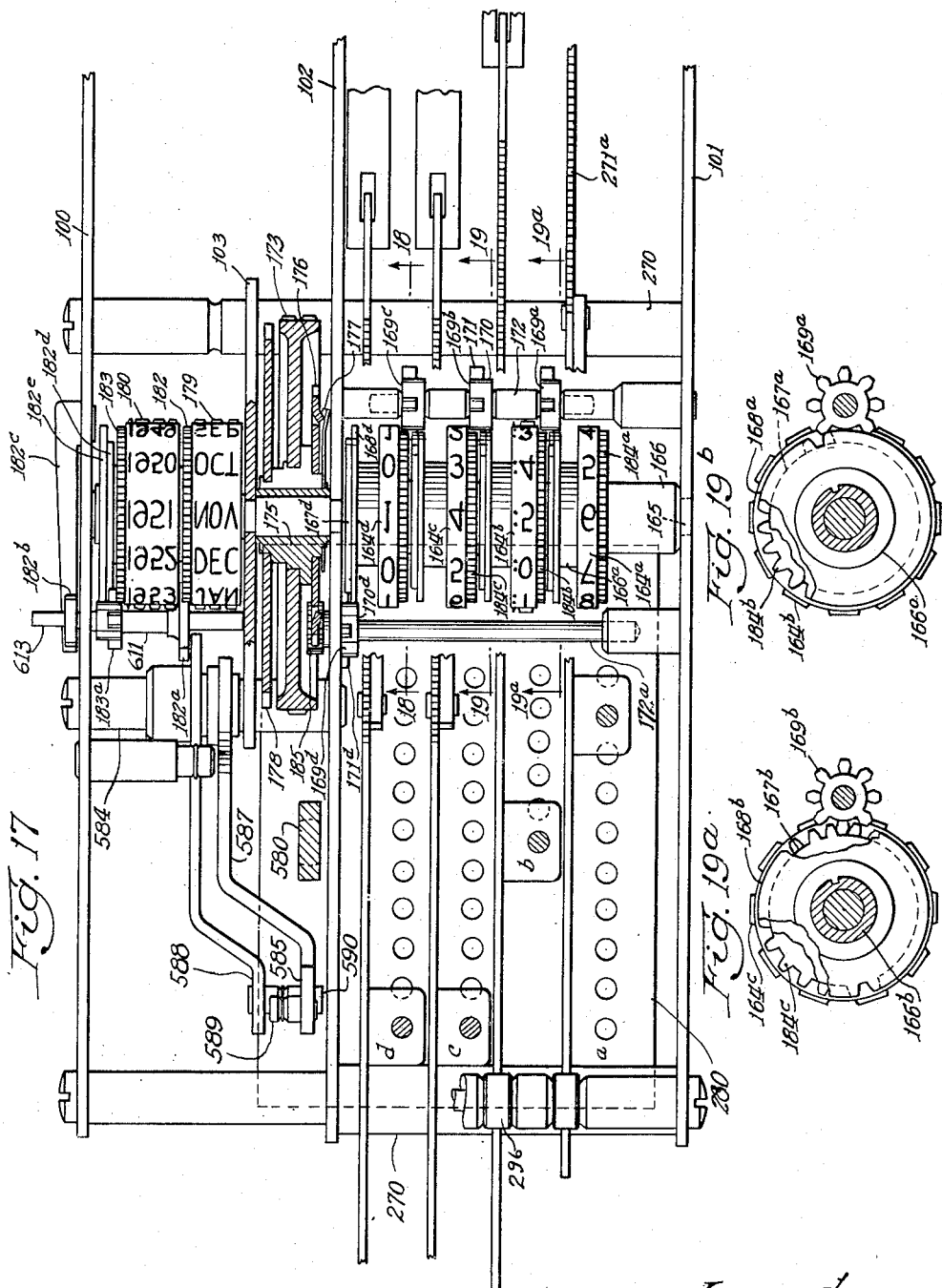

April 1, 1952          R. L. LORENZ          2,591,448
ELAPSED TIME RECORDER
Filed Sept. 2, 1947          20 Sheets-Sheet 15
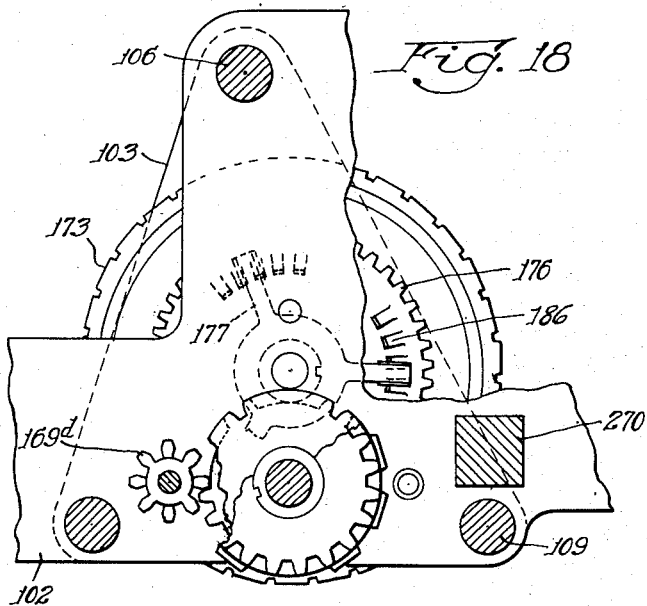
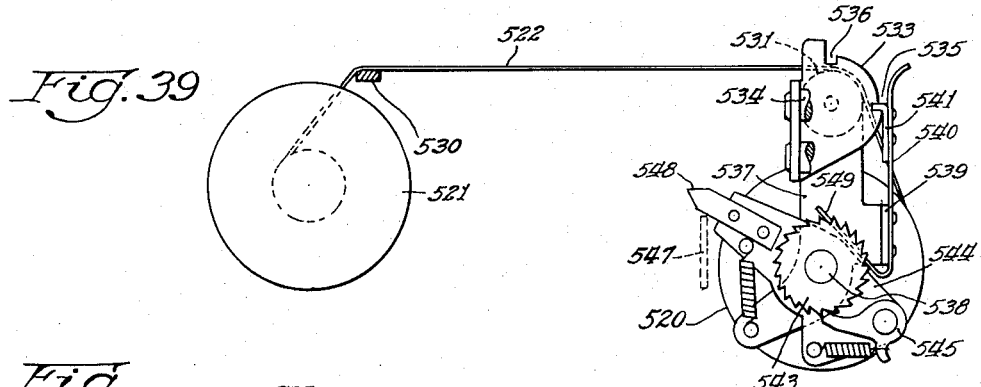
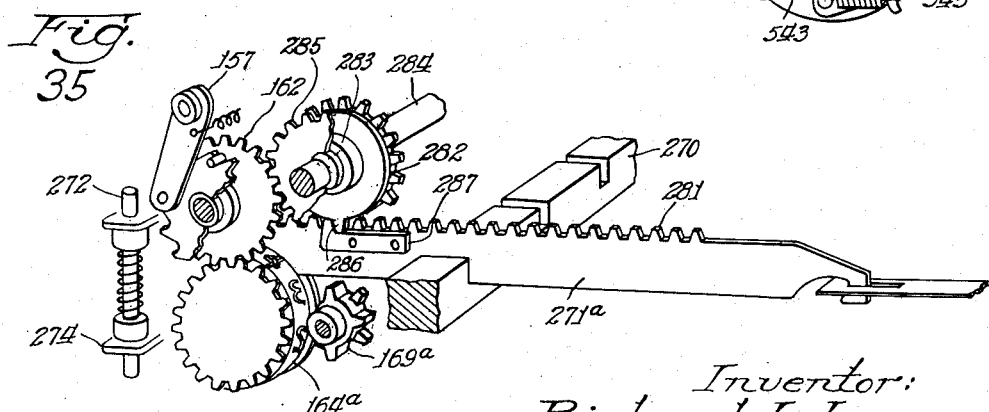
Inventor:
Richard L. Lorenz
By: Richard E. Burn
Atty April 1, 1952     R. L. LORENZ     2,591,448
ELAPSED TIME RECORDER
Filed Sept. 2, 1947     20 Sheets-Sheet 16
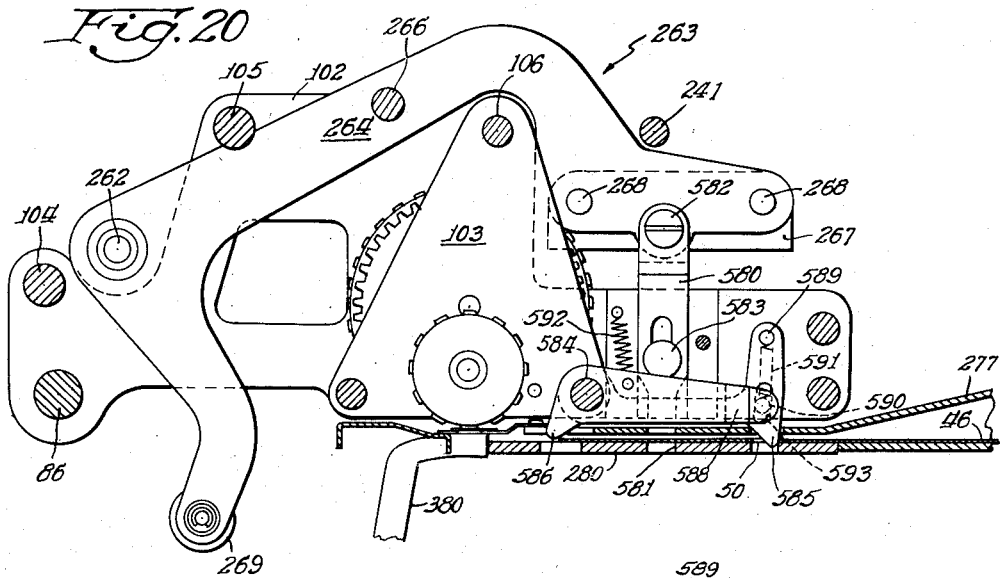
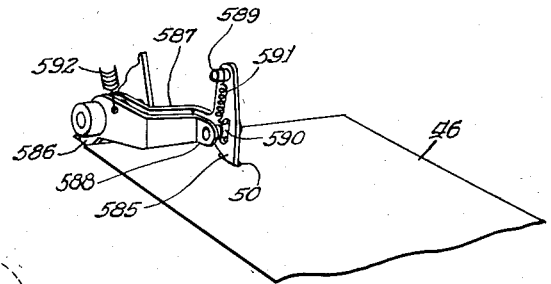
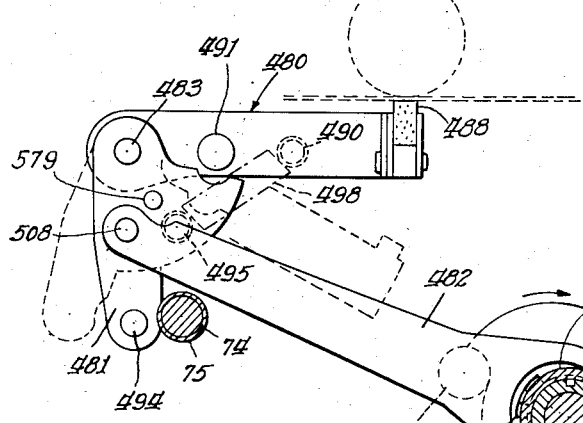
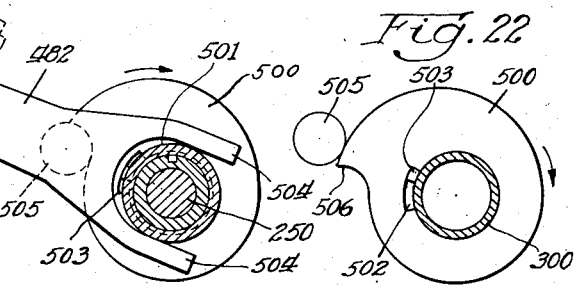
Inventor:
Richard L. Lorenz
By: Richard E. Burn
Atty.

April 1, 1952 R. L. LORENZ 2,591,448
ELAPSED TIME RECORDER
Filed Sept. 2, 1947 20 Sheets-Sheet 17

Inventor:
Richard L. Lorenz
By: Richard E. Burn
Atty

April 1, 1952

R. L. LORENZ 2,591,448

ELAPSED TIME RECORDER

Filed Sept. 2, 1947

Inventor:
Richard L. Lorenz
By: Richard E. Burn
Attys.

April 1, 1952
R. L. LORENZ
2,591,448
ELAPSED TIME RECORDER
Filed Sept. 2, 1947
20 Sheets-Sheet 19
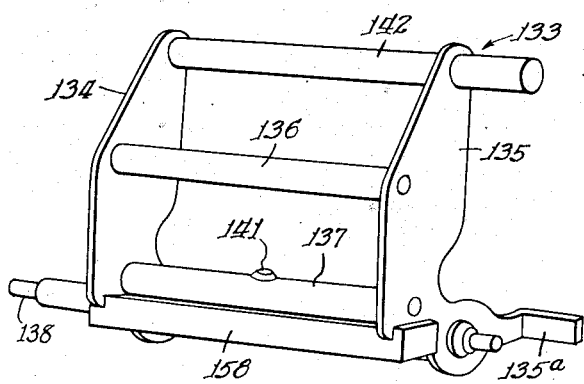
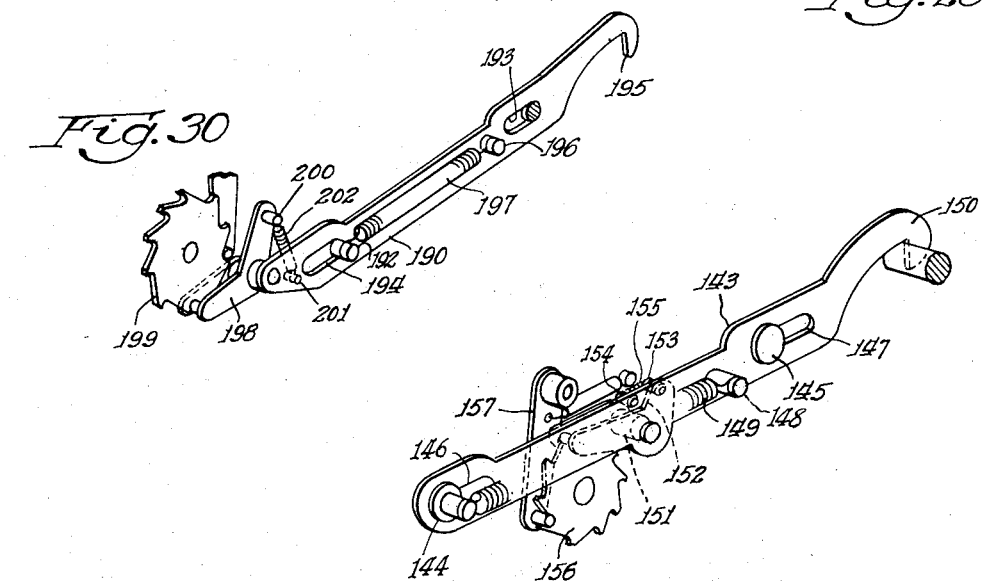
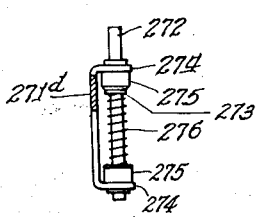
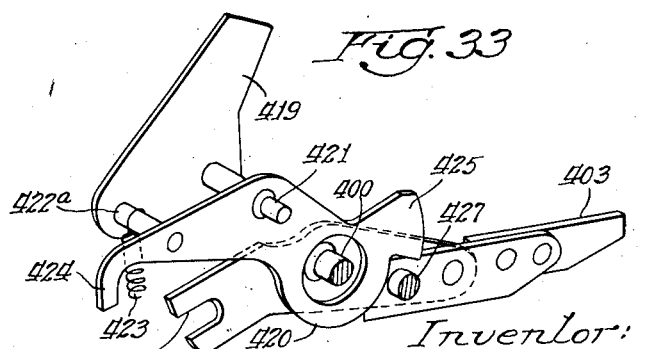
Inventor:
Richard L. Lorenz
By: Richard E. Burn
Atty.

April 1, 1952     R. L. LORENZ     2,591,448
ELAPSED TIME RECORDER
Filed Sept. 2, 1947     20 Sheets-Sheet 20
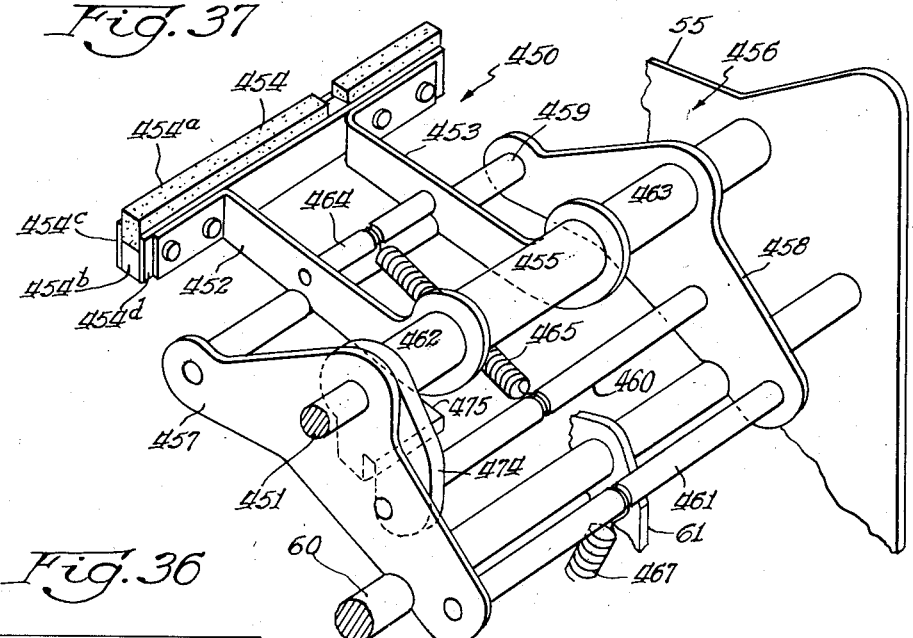
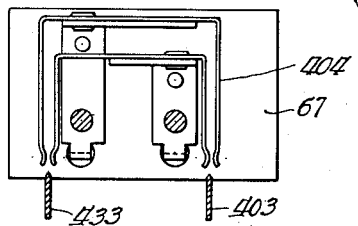
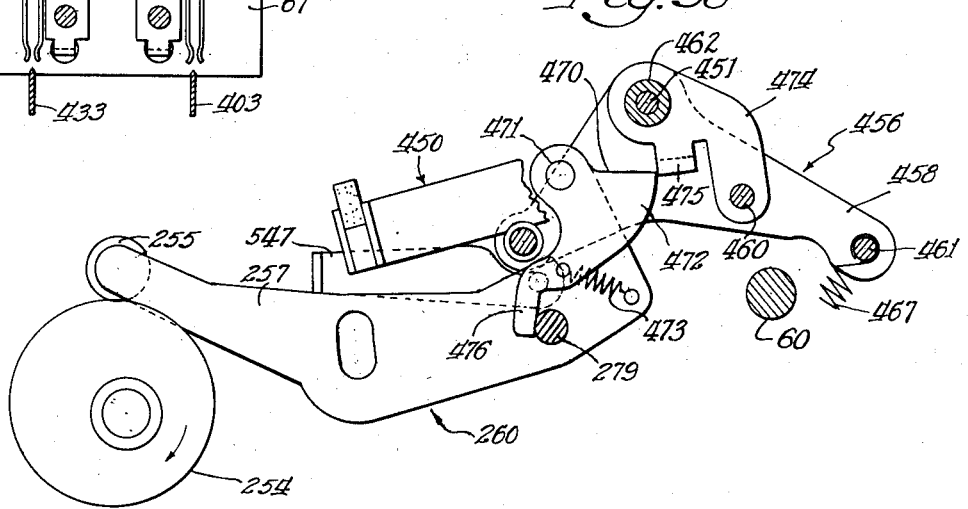
Inventor:
Richard L. Lorenz Patented Apr. 1, 1952

2,591,448

UNITED STATES PATENT OFFICE 2,591,448

ELAPSED TIME RECORDER

Richard L. Lorenz, Chicago, Ill., assignor to General Time Corporation, New York, N. Y., a corporation of Delaware Application September 2, 1947, Serial No. 771,767

18 Claims. (Cl. 235—61.8)

This invention relates to improvements in elapsed time recorders.

By elapsed time recorder is meant a recorder which will record the difference between two times, the difference being referred to as the elapsed time. In general, the elapsed time recorder which is shown herein comprises means to record a given time, hereinafter referred to as the "start time," on a card, together with means for recording the difference between the start time and the later time at which a card is inserted into the recorder. The start time is recorded on the card both by printing, and by holes which are punched in the card, the position of the holes with respect to each other and with respect to the top edge of the card, indicating the start time. When the card is reinserted into the machine to obtain a recording of the elapsed time, these holes are sensed, and the quantity or time represented by the sensing of the holes is subtracted from the current time position of the elapsed time type wheels, so as to give directly, the elapsed time reading. In the preferred embodiment of my invention the means for recording start time and the means for recording elapsed time are combined into a single machine, although it is obvious that the two means could be embodied in separate machines if so desired.

In the latter instance, there should be some means of synchronizing the two halves of the machine with respect to time. Such a means would be the usual time system, and as a matter of fact, it is contemplated that the elapsed time recorder herein shown be used in connection with such a time system. By time system, is meant a system in which impulses are transmitted at regular intervals to various secondaries, the term secondary including a time recorder such as that shown herein, as well as the usual impulse actuated clocks. The timing of the impulses transmitted is controlled by the usual master clock.

An elapsed time recorder, such as that herein shown and described, is of considerable utility in connection with bookkeeping systems wherein the time spent by an employee on a particular job is charged directly to that job. With the usual type of recorder the time at which the job is begun is stamped on the card, and then the time at which the job is completed is stamped on the card. The bookkeeper then subtracts the former from the latter to obtain the elapsed time. According to the present invention this subtraction is done automatically by the machine and the elapsed time is printed directly on the card. This elapsed time recorder is of utility in parking lots, military camps, safe deposit vaults and like places where it is desired to keep a record of the amount of time a visitor spends in a particular establishment. Furthermore, since the start time may be recorded on the card at one location, and the elapsed time printed on the card by a second recorder which is remotely situated, but which is synchronized therewith, the recorders could be used to record the elapsed time spent by railroad and street car employees, or by truck drivers, as giving a printed record of the length of time spent on a particular run. Furthermore, with the addition of a cyclometer which would represent units, a record could be made which would give the number of units produced in a given length of time, from which the average rate could readily be calculated.

It is an object of this invention to provide an improved elapsed time recorder in which elapsed time is recorded directly on a card or the like.

It is a further object of this invention to provide an improved elapsed time recorder in which the parts are so arranged that the time record is stamped on the record card or sheet as the record is disposed face up within the recorder. Thus, the printed record can be read by the operator immediately after withdrawal, without the necessity of inverting the record card.

It is a further object of this invention to provide an improved elapsed time recorder in which certain of the parts are located in the upper half of the machine, and certain of the parts in the lower half of the machine, and to provide for a hinged connection between the two halves, so that the machine can be opened up for inspection or repair, and in this connection, it is a further object to provide in such a machine, releasable operating connections between the upper and lower mechanisms disposed in the respective halves, so that the machine may be opened up.

It is a still further object to provide an improved time recorder mechanism which records time both by printing the time on the card, and by punching holes in the card.

A further object is to provide an improved device which senses a punched card, which performs a mathematical operation upon the data obtained by the punching, and which prints the result of that mathematical operation.

Still another object is to provide in a time recorder, an improved subtracting mechanism by means of which elapsed time can be calculated and recorded.

A still further object is to provide in an elapsed time recorder which embodies both punching means and sensing means, a common source of motive power for actuating said means selectively.

Other objects, features and advantages will become apparent as the description proceeds.

With reference now to the drawings, in which like reference numerals designate like parts, Fig. 1 is a perspective view of a preferred embodiment of my invention with the housing in place;

Fig. 2 is a side elevation of the mechanism with the housing removed, and with the top half raised;

Fig. 3 is a front view of the mechanism in the position in which it is shown in Fig. 2;

Fig. 4 is a top view of the punch side of the mechanism;

Fig. 5 is a top view of the sensing side of the mechanism;

Fig. 6 is a plan view of the mechanism taken along the line 6—6 of Fig. 2;

Fig. 7 is a section of the mechanism through the punch side taken along the lines 7—7 of Figs. 3 and 4;

Fig. 8 is a section through the sensing side of the mechanism along lines 8—8 on Figs. 3 and 6, showing the card trip and hammer mechanisms;

Fig. 10 is an elevation of the punch side of the top half of the mechanism;

Fig. 11 is a detail section taken along line 11—11 of Fig. 2, showing the cam shaft and the cams;

Fig. 13 is a view similar to Fig. 12, but showing the parts in a changed position;

Fig. 14 is an enlarged section taken along lines 14—14 of Figs. 5 and 12, showing the elapsed time type wheels in detail;

Fig. 15 is an enlarged section taken along lines 15—15 of Figs. 4 and 7, showing the start time type wheels in detail;

Fig. 16 is a detail view taken along line 16—16 of Fig. 14;

Fig. 17 is a horizontal section of the start time type wheels and associated parts taken along line 17—17 of Fig. 15;

Fig. 18 is a detail view taken along line 18—18 of Fig. 17;

Figs. 19 and 19a are detail views showing the cooperation of the Geneva change pinion with certain other parts of the type wheel assembly;

Fig. 20 is a section taken along line 20—20 of Fig. 4, showing the card block mechanism in detail;

Fig. 21 is a detail view of the hammer mechanism on the sensing side, the hammer being in a changed position from the position shown in Fig. 8;

Fig. 22 is a detail view of the cam shown in Fig. 21, the cam being in a changed position;

Fig. 23 is a diagram showing the timing of the various mechanisms on the sensing side;

Fig. 24 is an elevation of a card as printed and punched and showing elapsed time;

Fig. 27 is a detail view of the armature assembly;

Fig. 28 is a detail view of the ratchet actuating slide on the punch side;

Fig. 29 is a detail view of the card block mechanism shown in Fig. 20;

Fig. 30 is a detail view of the ratchet actuating slide on the sensing side;

Fig. 31 is a detail view taken along line 31—31 of Fig. 7, showing the construction of the punch plunger;

Figure 34:
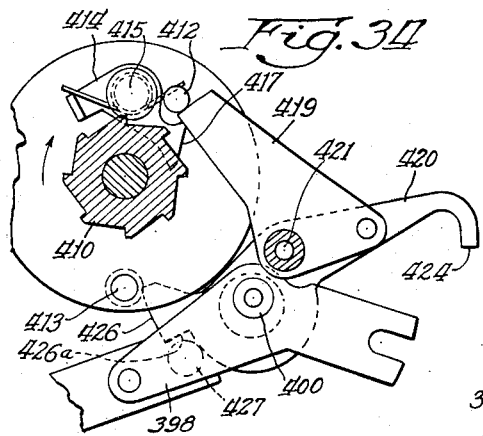
Figure 32:
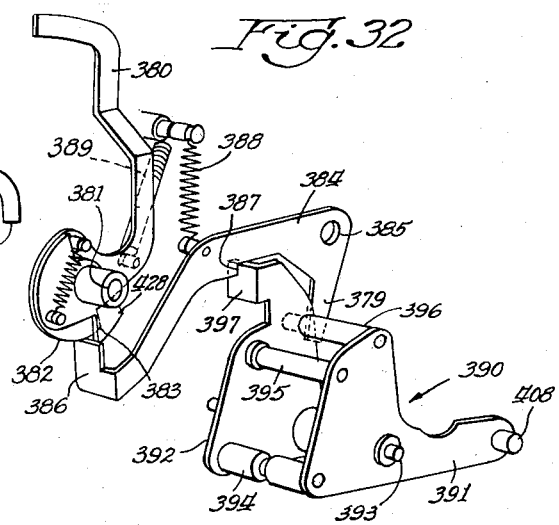

Figs. 32 to 34, inclusive, are detail views of certain elements of the card trip assembly on the punch side;

Fig. 35 is a detail view showing the cooperation between the start time type wheel assembly and the punch slide;

Fig. 36 is a detail view of the motor circuit closing means;

Figs. 37 and 38 are detail views showing various elements of the hammer mechanism on the punch side; and Fig. 39 is an enlarged section taken along line 39—39 of Fig. 4, showing the ribbon feed mechanism on the punch side.

In Fig. 1, the recorder is shown as having a housing 40 which is removably secured to a base 41. The base is mounted on a plurality of feet 42. In the front of the recorder are two funnel shaped openings 43 and 44, into which a card 46 may be inserted. The opening 43 is designated as the start time opening, and the opening 44 is the elapsed time opening. The housing 40 is also provided with a window 45 which exposes a set of time wheels disposed within the housing. The current time can be read through this window.

It will be seen that the card 46, in Fig. 24, carries printed matter at its top margin, and another line of printed matter at its lower half. The printed matter at the top margin is printed on the card when it is inserted in the start time opening 43. This printed matter includes the date 47, and the start time 48, that is, the time at which the card is inserted. When the start time is printed on the card, there is also punched in the card a group of holes 49. The position of said holes with respect to each other and with respect to the top edge of the card represents the start time. A block hole 50 is also punched in the card which will serve to prevent reinsertion of the same card into the start time opening.

When the card is inserted in the elapsed time opening 44, the date of insertion 51 is printed on the card and also the elapsed time 52. As indicated previously, the elapsed time represents the difference in hours and minutes between the times of insertion in the start time and elapsed time openings.

The housing 40 is arranged so that it may be readily removed to provide access to the mechanism. The mechanism itself is divided into two halves, which will be referred to hereinafter as the "punch side" and the "sensing side" of the machine. The start time opening 43 is on the punch side of the machine, and the elapsed time opening 44 is on the sensing side of the machine. The punch side of the machine includes means for printing the date 47 and the time 48, and for punching the holes 49 and 50. The sensing side of the machine includes sensing means for sensing the series of holes 49, and for subtracting the time indicated thereby from the current time in order to give elapsed time, and it also includes means for printing elapsed time 52 and the date 51. The mechanism of the machine is further divided into a top half and a lower half, the top half being hingedly mounted on the lower half, so that it may be swung from its operating position, as shown in Fig. 7, into an open position, as shown in Figs. 2 and 3.

The general structure

Figure 25:
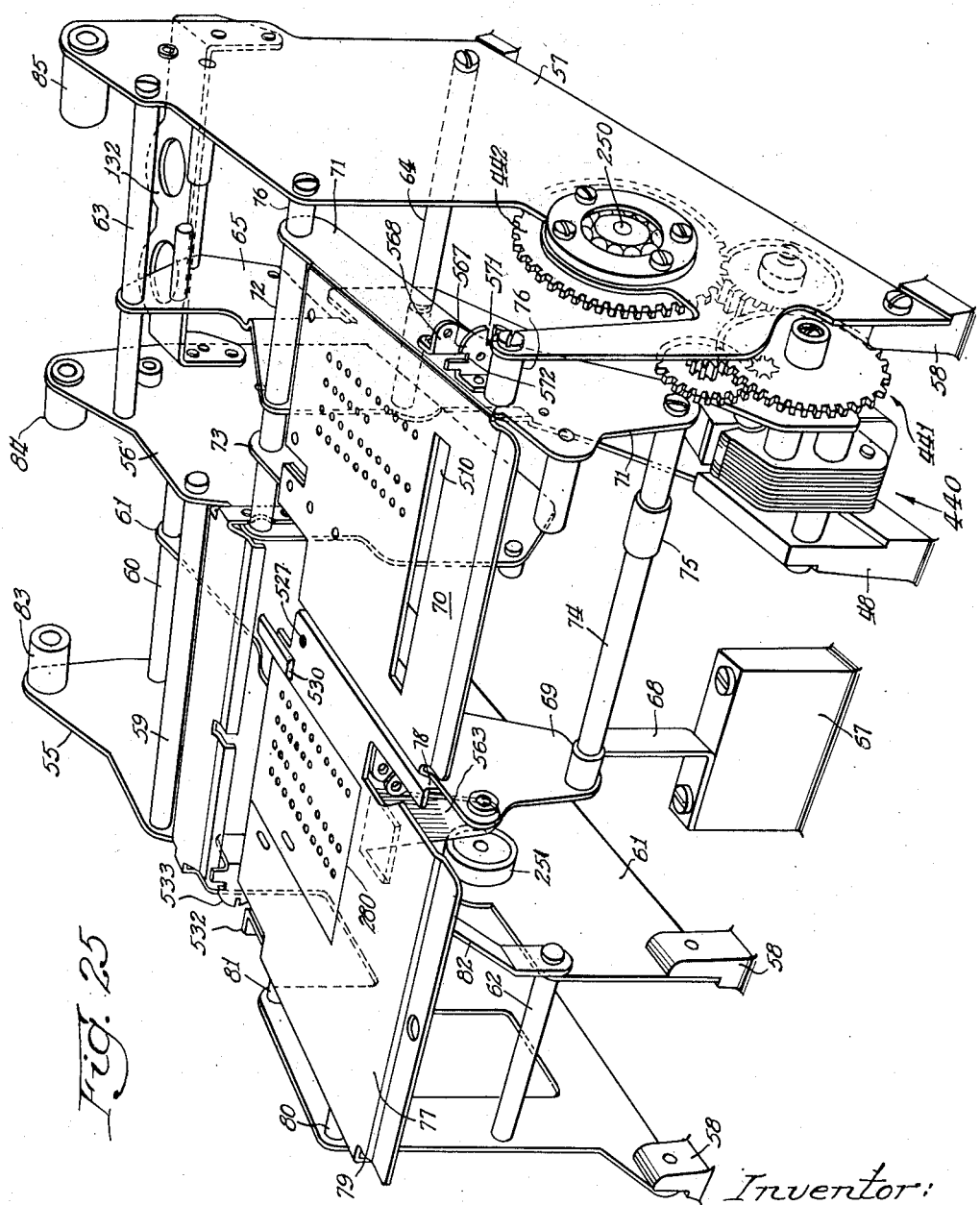
Fig. 25 is a perspective view of the various structural members of the lower half of the machine.

The structural members of the lower half are shown in Fig. 25 apart from the mechanism. In Figs. 4, 5 and 6 the structural members are shown in combination with the mechanism. The structural members comprise, for the most part, the usual series of plates and spacing pillars. The main plates are left plate 55, center plate 56 and right plate 57. These plates are secured by suitable lugs 58 to the base 41. The terms "left" and "right" as used herein refer to the left hand and right hand portions of the mechanism as viewed in Fig. 25, unless otherwise specified. The plates 55 and 56 are spaced from each other by means of a pillar 59 and a split pillar 60, as well as by the lugs 58, and by other means to be mentioned hereinafter. A sub-plate 61 is disposed between the left plate 55 and the center plate 56, and is spaced from these two plates by the split pillar 60. A pillar 62, at the front of the machine also spaces sub-plate 61 from left plate 55.

On the sensing side or right side of the machine, are disposed the split pillars 63 and 64 which space the center plate 56 and the right plate 57.

An insulating block 67 is disposed at the front of the machine in a central position and is suitably secured to the base 41. A strap bracket 68 is mounted on the insulating block and supports a side flange 69 which depends from a horizontally disposed member or table 70. The table 70 is disposed on the sensing side, and along its right hand edge as viewed in Fig. 25, is provided with a second depending side flange 71. A split pillar 72 is secured to center plate 56, sub-plate 65, side flange 71 and right plate 57, thereby spacing these members from each other. Secured to the under side of table 70 at its rear portion is a supporting bracket 73 which is also engaged by the split pillar 72.

A pillar 74 is disposed between the side flanges 69 and 71, this pillar also carrying a hardened collar 75 for the purpose hereinafter referred to. Two short pillars 76 space side flange 71 from right plate 57.

A similar table 77 is disposed on the punch side, and includes depending side flanges 78 and 79, by means of which the table may be spaced from and supported by the other structural elements. Pillars 80 and 81 space the side flange 79 from the left plate 55, and a strap bracket 82 supports the right front end of the table 77 from the sub-plate 61. The lower end of the strap bracket 82 is secured to sub-plate 61 by means of the pillar 62.

At the upper rear corners of plates 55, 56 and 57 are staked bushings 83, 84 and 85, respectively, which bushings are adapted to receive a hinge rod 86 which is shown in Figs. 3, 4 and 5.

Figure 26:
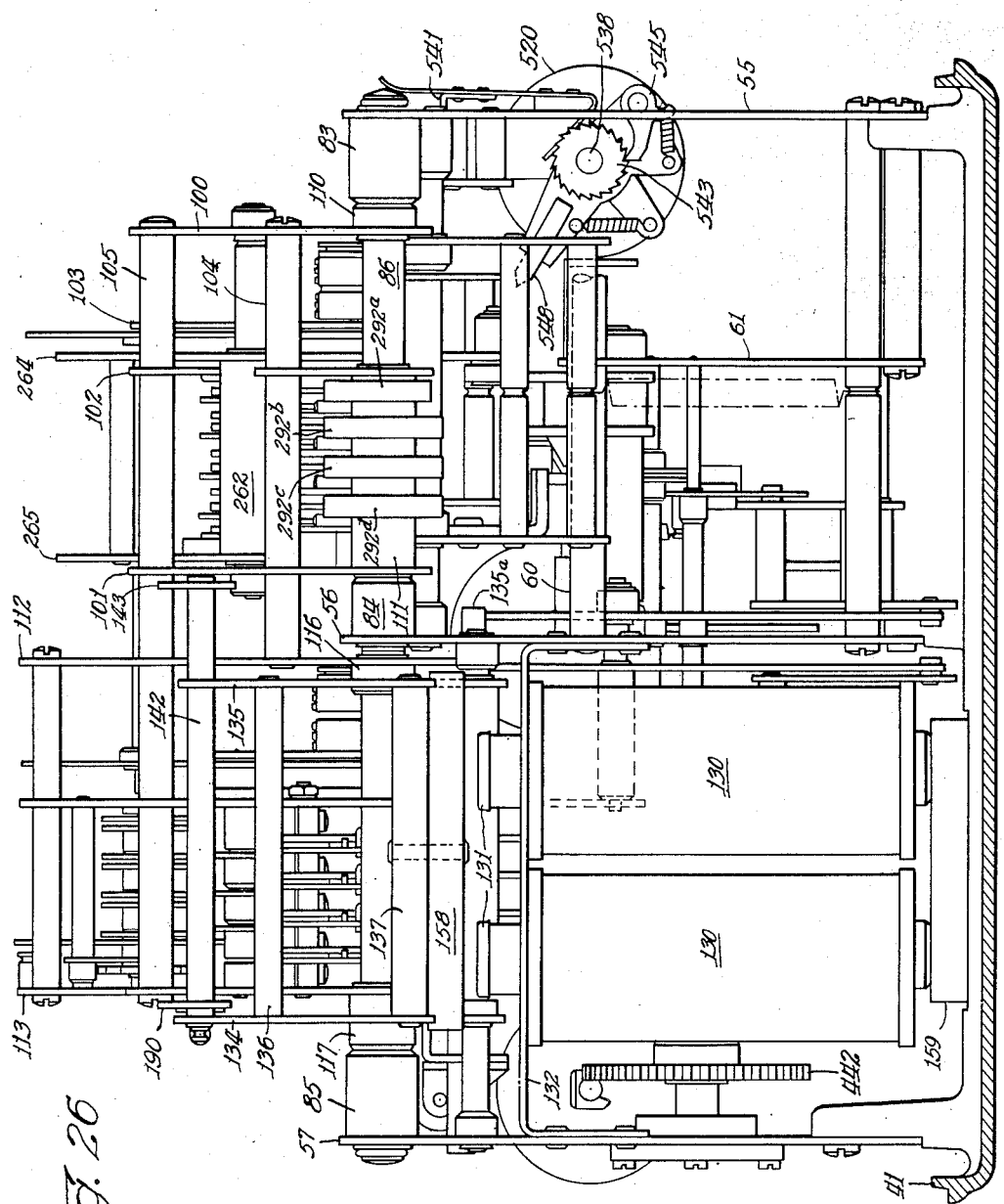
Fig. 26 is a back view of the mechanism.

The top half of the machine is supported on the hinge rod 86, and the punch side of the top half is best shown in Fig. 4, and that of the sensing side of the top half is best shown in Fig. 5. The structure of the top half also comprises a series of plates and pillars. Fig. 26 shows a back view of the mechanism in which the relationship of the punch side and sensing side of the top half to each other and to the lower half of the machine is illustrated.

The structure of the punch side of the top half comprises a left plate 100, a right plate 101, a sub-plate 102, and a partial sub-plate 103. A split pillar 104 spaces the plates 100, 102 and 101 from each other, and extends through the latter plate into the sensing side of the top half, as pointed out hereinafter. A split pillar 105 similarly spaces the plates 100, 102 and 101 from each other, and extends through to the sensing side. Other pillars are 106, which spaces plates 100, 103, 102 and 101, pillar 107 which spaces plates 100, 102 and 101, pillar 108 which spaces plates 100, 102 and 101, and pillar 109 which spaces plates 100, 103 and 102. A bushing 110 is staked to plate 100, and serves as a bearing through which the hinge rod 86 may extend. A similar bushing 111 is staked to and connects plates 102 and 101. As indicated in Figs. 26 and 7, a series of spiral springs 292a, 292b, 292c and 292d are mounted on the bushing 111. These spiral springs comprise strips of spring steel, one end of each of which is suitably secured, as by riveting, to the bushing 111.

The structure of the sensing side of the top half includes, as shown in Figs. 5 and 26, left plate 112, right plate 113, sub-plate 114, and a partial sub-plate 115, the latter being disposed toward the front of the machine. Bushings 116 and 117 are provided in plates 112 and 113, respectively. Split pillar 105 which spaces the several plates of the punch side extends through to the sensing side and ties together plates 112, 114 and 113. Split pillars 118, 119 and 120 are also provided to space plates 112, 114 and 113. The pillar 120 also spaces partial sub-plate 115 from the others and pillar 121 spaces left plate 112 and sub-plate 114 from right plate 113. Pillar 121a spaces sub-plate 114 from right plate 113.

The punch side and sensing side are tied together, as indicated above, by pillars 104, 105, 106 and 107 so that the top half may be pivoted as a unit about the hinge rod 86. Disposed within the supporting structure of the punch side of the top half are the start time type wheel assembly and the punch mechanism. Disposed within the supporting structure of the sensing side of the top half are the elapsed time type wheel assembly and the subtracting mechanism which subtracts start time from current time to give elapsed time.

Disposed within the supporting structure of the lower half are the sensing mechanism and electromagnetic means for advancing both type wheel assemblies; both of these latter groups of elements being disposed on the sensing side. Additionally, there are printing hammer mechanisms which are duplicated on both the punch and the sensing sides, together with driving means for actuating the printing hammers and the punch and sensing mechanisms. In each side there are means actuated by the insertion of a card into the start time or elapsed time openings to initiate the cycle of operation of the mechanism in the punch side or in the sensing side. In addition to these main groups of elements, there are smaller groups of elements and features, such as the ribbon feed, means for preventing the insertion of a card the second time in the start time opening, masking means to prevent the printing of elapsed time on a card which is incompletely punched, and blocking means for the time train on the sensing side which is operative to block any advance of the time train during the sensing and subtracting operations.

These various groups of elements will be described separately.

*The electromagnetic means for advancing both type wheel assemblies*

As shown in Fig. 26, at the back of the sensing side of the lower half is disposed an electromagnet designated generally by the reference numeral 130. The electromagnet includes a pair of pole pieces 131. The electromagnet is mounted by means of a yoke 132, also shown in Fig. 25, which is in the form of a U-shaped plate, the depending edges of which are riveted to the plates 56 and 57. The electromagnet is fastened to the base 41 by suitable screws (not shown) which pass upwardly through the base 41 and through a bar 159 of suitable magnetic material, such as "Norway iron," and which screws are threaded into the lower ends of the pole pieces 131.

Mounted for cooperation with the electromagnet is an armature shown in Fig. 27, and designated generally by the reference numeral 133. The armature comprises a framelike structure comprising a pair of plates 134 and 135 which are spaced from each other by pillars 136 and 137. The plates are recessed at their lower portion to carry an armature bar 158 which may be suitably secured to pillar 137 as by rivet 141. The armature 133 is pivotally mounted by means of an arbor 138 which is journaled in bushings 139 and 140 in plates 56 and 57, respectively. Thus the armature is mounted in the frame so that the armature bar 158 cooperates with the pole pieces 131.

A third pillar 142 is provided at the top of the armature, and is extended through and beyond plate 135, so as to engage the hooked end 150 of a slide 143 which is mounted by pins 144 and 145 in the plate 101, which forms a part of the punch side of the top half. The slide 143 is shown in detail in Fig. 28. It will be seen that it is provided with slots 146 and 147, through which the pins 144 and 145 extend so as to permit of sliding movement. The pin 148 is mounted toward the rear end of slide 143, and a spring 149 is tensioned between pins 144 and 148 so as to urge the slide forwardly, and hence the pillar 142 and the armature 133 into unoperated position.

Thus, the armature bar 158 is biased away from the pole pieces 131. Energization of the electromagnet 130 will cause the slide to be retracted backwardly, and deenergization of the magnet will cause the slide to be moved forwardly to advance the time train step by step in a manner hereinafter pointed out. The electromagnet 130 is adapted to be connected into the usual time control system. A time control system is characterized by means for transmitting electric impulses at regular intervals to one or more secondaries. The recorder herein described constitutes a secondary. The recorder herein shown and described is adapted to be used in connection with a time control system in which the energizing impulses are transmitted every minute. However, the recorder may be modified without departing from the principles of this invention so as to operate in connection with a time control system which transmits impulses at intervals other than one minute.

As shown in Fig. 2, the connection between the armature 133 and the slide 190 permits the disengagement of these parts as the top half is tilted upwardly. In this instance, the weight of the armature causes it to drop back into operated position, and impulses transmitted to the electromagnet will have no effect on the armature when the parts are in the position shown in Fig. 2.

As shown in Fig. 28, the slide 143 carries a pin 151 on which is mounted a pawl 152. The pin 151 extends through a hole in plate 101 so that the pawl 152 is disposed on the opposite side of the plate from the slide 143. The pawl engages a ratchet wheel 156 so that upon the deenergization of the electromagnet 130, after the receipt of each impulse, the ratchet wheel 156 will be advanced by one tooth. The pawl 152 carries a tail pin 153 between which tail pin and a pin 154 on slide 143, is tensioned a spring 155. Thus, the pawl is urged into engagement with the ratchet wheel 156. A suitable retaining pawl, 157, is provided for the ratchet wheel 156 to prevent backward rotation of the same during the retraction of pawl 152.

The slide 143 and its associated ratchet wheel 156 drive the time train on the punch side. Similar means, including a slide 190 are provided to drive the time train on the sensing side. These latter means will be described hereinafter in connection with the time train on the sensing side.

*The start time type wheel assembly*

The start time type wheel assembly includes a type wheel unit designated generally by the reference numeral 163. As shown in Fig. 15, the type wheel unit comprises three groups of type wheels. The first group comprises the minute and hour wheels 164a, 164b, 164c and 164d. The second group consists of the date wheel 173. The third group comprises the month and year wheels 179 and 180. Thus, the card 46, as shown in Fig. 24, can be stamped with the date 47 and the time 48.

Each minute and hour wheel 164 is secured to a hub 166, and the hubs are rotatably mounted on a shaft 165 which is supported in the right plate 101 and the sub-plate 102. To each hub is also secured a double tooth disk 167 and a locking disk 168. On a shaft 172 (see Figure 17) which is journaled in plates 101 and 102, are rotatably mounted Geneva change gears 169a, 169b, and 169c. The Geneva change gears are of the usual construction and comprise a four-tooth portion 170 which cooperates with the locking disk 168, and an eight-tooth portion 171 which is adapted to be driven by the double tooth disk 167. The eight-tooth portion is of sufficient width so that it meshes with a series of teeth 184 provided on the next type wheel 164. For instance, the double tooth disk 167a will advance the Geneva change gear 169a to the extent of two teeth or one-quarter of a revolution during each complete revolution of the hub 166a. This motion of the Geneva change gear will be transferred to the hub 166b, which in turn will be advanced to the extent of two teeth, thus providing the usual carry-over construction which is used in cyclometers and the like. If the type wheels are intended to print hours and minutes, as in the instant case, there will be twenty teeth in each of the series of teeth 184a, 184c, and 184d, and ten printing positions on each of the corresponding type wheels 164a, 164c and 164d. However, the type wheel 164b will have twelve printing positions, and hence will have twenty-four teeth in the series 184b. Thus, the Geneva change gear 169a will advance the type wheel 164b by a twelfth of a revolution, whereas the Geneva change gears 169b and 169c will advance the type wheels 164c and 164d respectively, by a tenth of a revolution. The twelve printing positions comprise two series of six characters, each series running from 0 to 5, inclusive. The locking disk 168b has two slots and the double tooth disk 167b has two sets of double teeth, as shown in Fig. 19a, so that type wheel 164c will be advanced one printing position for each half a revolution of type wheel 164b.

The engagement of the four-tooth portion 170 and the eight-tooth portion 171 with the respective locking disk 168 and double tooth disk 167, is shown in Figs. 19a and 19b. It will be seen that the four-tooth portion and the locking disk prevent any movement of the cooperating Geneva change gear, and the next successive type wheel unit, except at the carry-over positions between nine and zero, or five and zero, as the case may be.

The ten printing positions of type wheel 164d comprise five series of two characters, "0" and "1," so that the minute and hour type wheels 164 will record up to twenty hours, and repeat. The particular recorder herein shown is adapted to be used in connection with a time control system which may record twenty hours a day, the impulses for the remaining four hours being cut out by a suitable program instrument, in accordance with the usual practice. Accordingly, means are provided to carry over the rotation from the last hour wheel 164d to the date wheel 173, every twenty hours. This means comprises a Geneva change gear 169d which is secured to the shaft 172a, as shown in Fig. 17. The four-tooth portion 170d engages with a locking disk 168d which has five slots therein, and the eight-tooth portion 171d meshes with a disk 167d which has five sets of double teeth, as shown in Fig. 17.

The shaft 172a extends through sub-plate 102 and is provided at its extended end with a pinion 185, which transmits the motion of the Geneva change gear 169d to a gear 176 which is rotatably mounted on the hub 175 of the date wheel 173.

The hub revolves around a shaft 174 which is mounted in sub-plate 102 and partial sub-plate 103. Keyed to the hub is a tripod spring 177, shown in Figs. 17 and 18, the three arms of which engage upset portions 186 formed in the gear 176. Thus, the date wheel 173, keyed to the hub, may be driven from the shaft 172 through the coupling provided by the upset portions 186 of the rotatably mounted gear 176 and the tripod spring 177.

In operation, as the type wheel 164a is rotated through its ten printing positions, every tenth minute its motion will be carried over to type wheel 164b, and the motion of the latter carried over every hour to advance type wheel 164c to the next printing position. In a similar manner every tenth hour, the motion of type wheel 164c will carry over and advance type wheel 164d one printing position, and every twentieth hour the motion of the latter will carry over and advance the date wheel 173 one printing position, after which the minute impulses to the recorders are cut out by the program instrument. The recorder is again cut in at the starting time next day. The date wheel is provided with thirty-one printing positions, for the thirty-one days of the month. Suitable means, hereinafter described, may be provided to advance the date wheel manually to compensate for months having less than thirty-one days.

The month and year type wheels 179 and 180, which are adapted to be advanced manually, are mounted on a stepped shaft 181 which is journaled in partial sub-plate 103 and left plate 100.

As shown in Figs. 15 and 17, a gear 182, suitably secured to the month wheel 179, meshes with and is driven by a pinion 182a carried on a set shaft 611, journaled in plates 103 and 100, and extending through the latter. The set shaft also carries a Geneva change pinion 183a, the four-tooth portion of which cooperates with a locking disk 182e, and the eight-tooth portion of which meshes with a double tooth disk 182d and a series of teeth 183 formed integrally with the year wheel 180. The elements 182e, 182d, and 179 are keyed to the stepped shaft 181, whereas the year type wheel 180 is rotatably mounted thereon.

The extended portion 613, of set shaft 611 is slabbed so as to be engaged by a set key furnished to the operator. The arrangement is such that with every quarter turn of the set shaft, the month wheel 179 will be advanced one printing position, and between the December and January printing positions, an automatic carry over to the year wheel 180 is provided.

A four lip cam 182b, is carried on the extended portion 613, and cooperates with a leaf spring 182c, fastened to plate 100, to provide a click. The lips 616 of the four lip cam 182b, as shown in Fig. 10, are spaced 90° apart, so that the click serves to maintain the month wheel 179 centered in one or another of its twelve printing positions.

The type wheel 164a is advanced one minute at a time by means of a drive gear 162a which is suitably secured to a hub 160 on which the ratchet wheel 156 is mounted. The hub 160 is journaled on a shaft 161 which is mounted in plates 101 and 102. Thus, the type wheel unit may be advanced automatically to the extent indicated, by the energization of electromagnet 130 by the minute impulses.

*The elapsed time type wheel assembly*

The elapsed time type wheel assembly is mounted in the sensing side of the top half. As shown in Fig. 2, a slide 190, having slots 193 and 194 is mounted for sliding movement on pins 191 and 192. The rear end of the slide 190 is hooked as indicated by reference numeral 195, for engagement with pillar 142. These parts are also shown in Fig. 5, in plan. A pin 196 is secured to the slide 190, and a spring 197 is tensioned between pins 192 and 196 to urge the slide forwardly, in the same manner as pointed out in connection with the slide 143. A pawl 198 is suitably pivoted at the front end of the slide 190, as indicated in Fig. 30, and is adapted to engage the teeth of a ratchet wheel 199. A pin 200 projects from the tail of the pawl 198, and a spring 202 is tensioned between said pin and a pin 201 which projects from the surface of slide 190. Thus, the pawl is urged into engagement with the ratchet wheel, so that reciprocation of the slide 190, when the electromagnet 130 is energized and deenergized, will cause a step by step advance of the ratchet wheel 199.

A time train or cyclometer unit 203, is mounted on the same shaft 204, as the ratchet wheel 199, and is driven thereby. Rotatably mounted on shaft 204 are hubs 205a, 205b, 205c and 205d. Each of these hubs carry a drive wheel 206, and hub 205a also carries the ratchet wheel 199. Lock disks and double tooth disks 207 and 208 are carried by hubs 205a, 205b and 205c, a pair of each being provided for each hub. A Geneva change pinion 209a (not shown) is mounted on a shaft 210a to carry over the rotation from hub 205a to drive wheel 206b, in the usual manner. Similarly, a Geneva change pinion 209b mounted on a separate shaft 210b, and a Geneva pinion 209c (see Fig. 14) mounted on a separate shaft 210c, are provided to carry over the rotation of hub 205b to drive wheel 206c, and from hub 206c to drive wheel 206d, respectively. The operation of these elements has been described in connection with the start time type wheel assembly and need not be repeated here. For the sake of convenience, the different Geneva change pinions are mounted on separate shafts 210a, 210b and 210c, the relationship of these shafts to shaft 204 being shown in Fig. 12. These shafts are suitably journaled in right plate 113 and in sub-plate 114, as is the shaft 204.

Mounted just below the cyclometer unit 203 and driven thereby is an intermediate gear assembly 211. As shown in Fig. 14, this comprises a shaft 213 journaled in plates 113 and 114 on which are rotatably mounted a plurality of hubs 212a, 212b, 212c and 212d. Intermediate gears 214a, 214b, 214c and 214d are secured to their respective hubs, and mesh with and are driven by drive wheels 206a, 206b, 206c and 206d.

Figure 12:
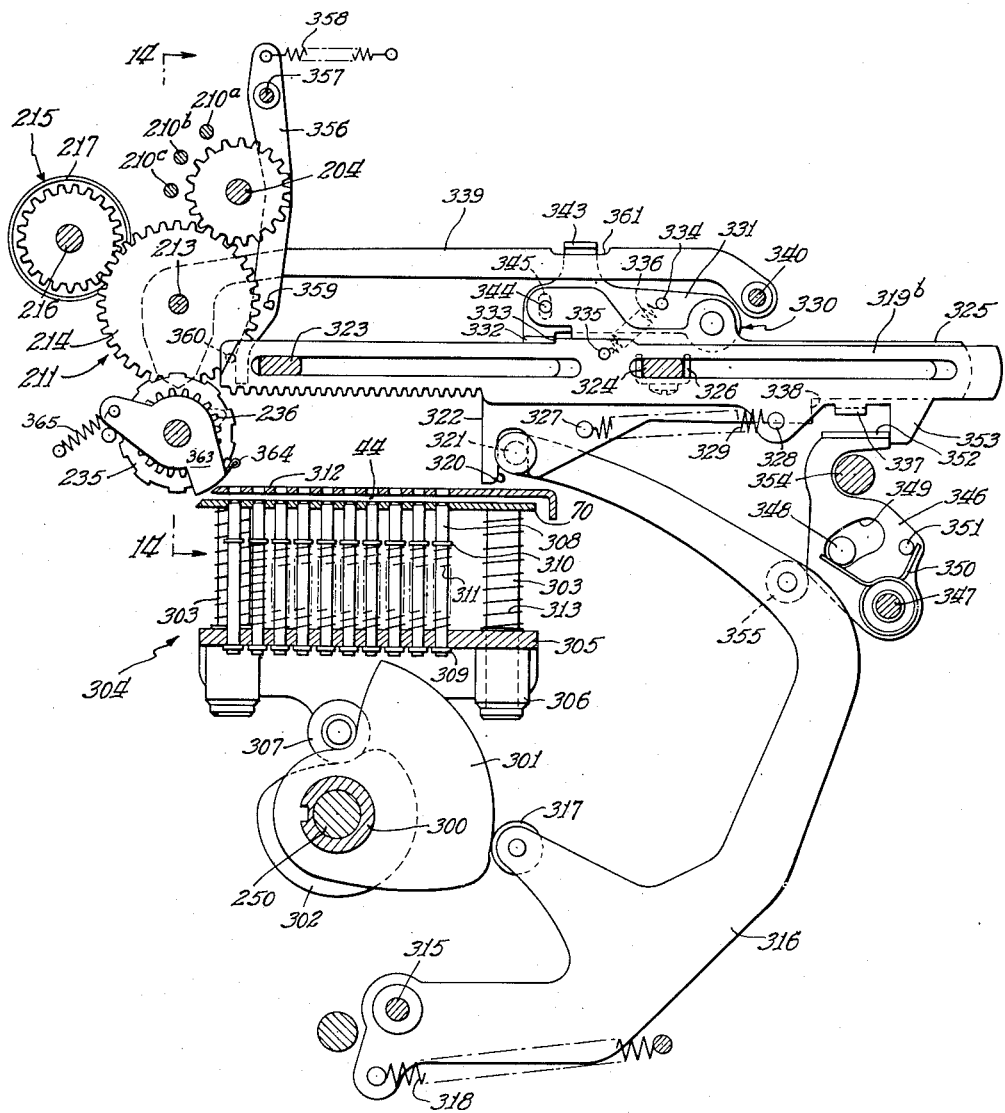
Fig. 12 is a detail view of certain parts on the sensing side of the mechanism.

A time indicator assembly 215 is disposed forwardly and slightly above the intermediate gear assembly 211, as shown in Figs. 5 and 12. The time indicator assembly comprises a shaft 216 journaled in plates 213 and 214, on which are rotatably mounted indicator wheels 217 to indicate to the operator the current time. These wheels are disposed just behind the window 45. Furthermore, at any particular instant, they will agree with the printing positions of the minute and hour type wheels 164 on the start side.

The type wheel assembly, indicated generally by the reference numeral 220, comprises hour and minute type wheels 235a, 235b, 235c and 235d, date type wheel 238, and month and year type wheels 225 and 226.

The hour and minute type wheels 235 are mounted on hubs 221a, 221b, 221c and 221d, respectively, and the hubs are rotatably mounted on a shaft 222, which is mounted in plates 113 and 114. Rotatably mounted on a shoulder portion of these hubs, are gears 230a, 230b, 230c and 230d, which mesh with and are driven by intermediate gears 214a, 214b, 214c and 214d, respectively. These gears, as shown in Fig. 16, are provided with a perforation 231. The rotation of gears 230 is transmitted to their respective hubs 221 through spring washers 232a, 232b, 232c and 232d, which washers are keyed to their respective hubs 221. These spring washers, as shown in Fig. 16, are each provided with friction arms 233, and with a click arm 234, the end of the click arm being deformed for engagement with the perforation 231. Thus, the type wheels 235 which are keyed to the hubs 221, may be driven by the cyclometer unit 203, through the intermittent gears 214, but the spring washers 232 provide a clutch coupling between the two which permit the type wheels to be driven independently of the cyclometer unit.

Also keyed to the hubs 221 are gears 236a, 236b, 236c, and 236d. Means will be described hereinafter which mesh with and drive the gears 236 so that the hour and minute type wheels 235, which are normally disposed in a printing position, which corresponds to current time, can be rotated in the reverse direction, into a printing position representing a smaller value. This operation takes place whenever a card is sensed, the extent to which the type wheels are rotated backwardly depending upon the value of start time which is represented by the series of holes 49 which are punched in the card. The cooperation of the click arm 234 with the perforation 231 insures that each type wheel will be returned to its original printing position after sensing takes place, and will be advanced thereafter in current time, receiving the driving urge through perforation 231 and click arm 234, the depression of the latter entering into perforation 231 upon restoring the type wheels to original printing position.

The date type wheel 238 is suitably staked to a hub 223, which in turn revolves on a shaft 224 mounted in plates 114 and 115. The hub 223 also carries a gear 239, which meshes with, and is driven by a gear 240. The latter is carried on a transfer shaft 241, the reduced right hand end of which is journaled in plate 114, as shown in Figs. 5 and 14, and the left hand end of which is journaled in plate 100 on the start time side, as shown in Fig. 4. As shown in Fig. 3, the shaft 241 is provided toward its left hand end, with a gear 242 which meshes with and is driven by gear 178 which is associated with the date wheel 173 on the sensing side of the machine. The shaft 241, where it projects through the plate 100, is provided with a slab end 243. Thus, a key may be applied to rotate the shaft 241 to change the printing positions of both of the date wheels 173 and 238. It has already been pointed out that the former is normally driven by the minute and hour type wheel unit 163 on the punch side of the machine, but that in certain instances, due to the cyclical operation of the recorder, it is necessary to shift the position of the date type wheel 173 with respect to the hour and minute type wheels 164.

Therefore, the date 51 on the card 46, as shown in Fig. 24, always represents the date on which the card was inserted into the elapsed time opening 44, whereas the hours and minutes 52 on the card, represent elapsed time, and not current time.

The month and year type wheels 225 and 226 on the elapsed time side are mounted on a step shaft 227 which in turn is journaled in the plates 112 and 115. The month wheel 225 is keyed to 227. Associated with each of these wheels, are gears 228 and 229. Suitable means as shown in Fig. 5, engage the gears to insure that the month and year type wheels are centered in the proper printing position. The printing position of these wheels may be adjusted manually, as pointed out above in connection with the month and year type wheels 179 and 180 on the punch side, and the means used are the same.

*The punch mechanism*

The punch mechanism is driven from a cam shaft 250 which is shown in Figs. 6, 7 and 11. The cam shaft is journaled at one end in a ball bearing unit 251 in sub-plate 61, and at the opposite end in a ball bearing unit 252 in right plate 57.

A hub 253 is rotatably mounted on the punch side of the cam shaft 250, and carries a cam 254. Means for establishing a driving connection for a single revolution, between the hub 253 and the cam shaft 250, and for driving the cam shaft will be pointed out hereinafter. A follower roller 255 suitably mounted on a shaft 256 is disposed for cooperation with the cam 254. These parts form a part of an actuating lever assembly designated generally by the reference numeral 260, and which, as shown in Fig. 6, comprises a pair of parallel plates 257 and 258 which are spaced by one or more pillars 259. The actuating lever assembly 260 is pivoted on a shaft 279 which is suitably supported in the plates 61 and 56. The shaft 256 is journaled in the plates 257 and 258.

As cam 254 rotates through a complete revolution, the actuating lever assembly 260 will be rocked in a counter-clockwise direction, as viewed in Fig. 7. Thus, a punch lever assembly 263 is caused to rock in a clockwise direction, as shown in Fig. 7, to depress a plurality of punch plungers 272.

The punch lever assembly comprises a pair of plates 264 and 265 which are spaced from each other by pillar 266, the assembly being also spaced by a shoulder on a shaft 262. The shaft 262 is journaled in plates 100 and 101, as shown in Fig. 4 in the top half of the machine. Plate 264 is provided with a portion which extends downwardly into the lower half of the machine and carries a roller 269 which is disposed adjacent the tail end of plate 258 in the actuating lever assembly 260 (see Fig. 20). The plate 258 at the point of engagement with the roller 269 is provided with an arc shaped edge 261 which is drawn about the hinge rod 86, as a center, when the parts are in the position shown in Fig. 7. Thus, the top half may be lifted, as shown in Fig. 2.

The punch lever assembly is provided at its front end with a U-shaped plate 267, as shown in Figs. 4 and 7, which is secured thereto by suitable rivets. Disposed beneath the plate 267 are a plurality of slides 271, which are individually designated as 271a, 271b, 271c and 271d. These slides are mounted at their front and rear ends in slotted guides 270. The slides carry the punch plungers 272, the construction of one of which is shown in detail in Fig. 31. The slide 271 is provided with a vertically disposed portion which is bent over to provide upper and lower ears 274 which carry bushings 275, in which the plunger 272 slides. The plunger is provided with a snap ring 273 fitted into a groove in the plunger, and a spring 276 is confined between the snap ring 273 and the lower bushing 275, so that the plunger 272 is urged upwardly into its inoperative position. That portion of the table 77 which is disposed beneath the punch plungers 272 is cut away, and a die plate 280 is mounted thereon, as shown in Fig. 7. The die plate, as shown in Fig. 17, is provided with four rows $a$, $b$, $c$, and $d$, of apertures, there being ten apertures in rows $a$, $c$ and $d$, and six in row $b$. Each row is aligned with the travel of the corresponding one of the plungers 272. A substantially horizontally disposed stripper plate 277 is suitably mounted on the top half of the machine, and also carries four rows of perforations which are aligned with the perforations in the die plate 28. Thus, a card may be inserted between the stripper plate 277 and the die plate 280, and upon actuation of the punches 272 by the rocking of the punch lever assembly 263, the four holes 49 will be punched in the card.

The positions of the holes 49 are determined by the positions of the slides 271, and the positions of the slides are in turn determined by the start time type wheel assembly. The slides 271 are each provided with a series of teeth 281 which mesh with a series of interrupted gears 282a, 282b, 282c, and 282d. These interrupted gears, as shown in Figs. 7 and 35, are carried on hubs 283a, 283b, 283c and 283d, to which hubs are also staked gears 285a, 285b, 285c and 285d, which mesh with and are driven by drive gears 162a, 162b, 162c and 162d, in the start time type wheel assembly. Thus, the position of each slide 271 is determined by the position of the corresponding type wheel 164.

Inasmuch as the type wheels 164 are adapted for unidirectional rotation, whereas the slides 271 are adapted for reciprocating movement, provision is made for the return of the slides from their most extended position, as exemplified by the position of the slide 271c and its punch plunger 272c in Fig. 7, to the zero position, as exemplified by the slide 271b and its punch plunger 272b, as shown in the same figure. This return to the zero punch position is effected as the type wheel passes from the nine printing position to the zero printing position. The slides 271 are individually urged into their zero positions by the springs 292a, 292b, 292c and 292d, which have been referred to previously as being mounted on the bushing 111. When a slide 271 arrives at its number 9 punch position, the interrupted portion of interrupted gear 282 is in such a position that any further rotation of the interrupted gear as the type wheel moves from its number 5 or number 9 printing position into the zero position, will cause the rack teeth to be disengaged, thereby permitting the spring 292 to return the slide to its zero position. As shown in dotted lines in Fig. 7, and also shown in Fig. 15, a fragmentary rack 287, carrying but one tooth, is secured to the slide alongside the rack teeth 281. The position of the fragmentary rack 287 is such that when the slide 271 is retracted to its zero position, the fragmentary rack will be engaged by a single toothed gear 286 which is also carried on hub 283. Thus, means are provided for advancing the rack from its zero position to its number 1 position even though the interrupted portion of the interrupted gear 282 does not permit engagement of the interrupted gear 282 with the rack teeth 281. This mechanism, which includes the fragmentary gear 287 and the single tooth gear 286, is provided on each of the four slides 271 and hubs 283.

A suitable stop lug 295, projecting from the front end of each slide 271, is provided for engagement with the front slotted guide 270 to take up the impact of the slide when it is returned to its zero position, thus avoiding breakage of the teeth on the single tooth gear 286 and the fragmentary rack 287. Also rollers 296 keep slides 271 in their respective slots in the front guide 270.

Thus, it will be seen that the four punch plungers 272 are always in a position which corresponds with the printing position of the hour and minute type wheels 164. When a card is inserted in the start time opening 43, it is guided between the plate 277 and the die plate 280. As it is manually pushed into its home position, means hereinafter described are engaged by the top edge of the card for tripping certain mechanism which initiates rotation of the cam shaft 250, and causes the rotation of the cam 254 for a single revolution. This causes the displacement of the actuating lever assembly 260 in the lower half of the machine, which in turn causes displacement of the punch lever assembly 263 in the upper half of the machine. The punch lever assembly is biased into the position shown in Fig. 7 by a suitable spring 289. Displacement of the punch lever assembly causes the punch plungers 272 to punch four holes in the card, the position of which holes corresponds in magnitude to the printing position of the type wheels 164. A suitable container chute 293 is disposed under the die plate 280 to receive the punchings. At about the same time that the card is punched, a printing hammer 450 is actuated by the displacement of the actuating lever assembly 260 to strike the under side of the card at the point opposite the type wheels. Thus the date 47 and start time 48 are printed on the card 46.

*The sensing mechanism*

The sensing mechanism includes a series of sensing plungers 308, forming a part of a sensing head 304, which is disposed in the lower half of the machine on the sensing side. The sensing mechanism also includes displaceable means disposed in the upper half of the machine on the sensing side, the displacement of which means is regulated in extent by the position of those sensing plungers which are permitted to project through the holes in the card 46. The displacement means are operatively connected with the elapsed time type wheel assembly to the end that the start time which is sensed by the sensing mechanism may be subtracted from the current time in order to bring the printing position of the type wheels 235 into a position wherein they will print elapsed time.

As shown in Fig. 11, a sleeve 300 is rotatably mounted on the cam shaft 250. Slide cams 301a, 301b, 301c and 301d are suitably mounted on the sleeve 300 to rotate therewith, as also are a pair of sensing cams 302. These various cams are suitably spaced from each other by means of spacing collars. The configuration of these cams is shown in Figs. 12 and 13.

Depending from table 70 are four vertically disposed guide posts 303, on which the sensing head 304 is mounted. The sensing head includes a perforated plate 305 which carries at its front and back edges sleeves 306, which are adapted to slide on the guide posts 303. The side edges of the perforated plate 305 are turned downwardly, and carry rollers 307 for cooperation with the sensing cams 302.

Means to be hereinafter described are provided for operatively connecting the sleeve 300 with the cam shaft 250 for a single revolution. Thus, the sensing cams 302, as well as the slide cams 301 will be rotated through a single revolution and cause the sensing head 304 to be moved upwardly.

The perforations in the perforated plate 305 are arranged in four rows of 10, 6, 10 and 10 perforations respectively, as in die plate 280. Aligned perforations are also provided in the table 70. In each pair of aligned perforations is disposed a sensing plunger 308, as is shown in Figs. 12 and 13.

Springs 311, surrounding the plungers and confined between portions 310 of enlarged diameter and the plate 305, urge the plungers upwardly to a position determined by snap rings 309, as shown in Fig. 12. In this position of the parts, the plungers are clear of the card slot 44 between the table 70 and a perforated top plate 312.

As the rotation of the sensing cam 302 displaces the sensing head 304 upwardly, the sensing plungers 308 also tend to project into the slot 44. However, when a perforated card 46, as shown in Fig. 13, is disposed in the slot 44, the upward motion of the sensing plungers 308 will be blocked, except for that plunger in each row which is disposed beneath the perforation in the card. As shown in Fig. 13, the plunger which occupies the number 9 position in that particular row, (row c) projects through an aperture of the card, and serves to limit the extent of the displacement of a sliding rack carrier 325 disposed in the upper half of the machine. The arrangement of parts in the sensing head, including the springs 311, introduces the necessary lost motion between the sensing plungers 308 and the perforated plate 305. Springs 313 confined between the table 70 and the perforated plate 305 urge the sensing head downwardly and the rollers 307 against the sensing cams 302.

Disposed transversely of the machine, and somewhat below the cam shaft 250 is a rod 315 on which four levers 316a, 316b, 316c and 316d are pivoted. The side by side arrangement of these levers is shown in Fig. 6. The sections shown in Figs. 12 and 13 show the complete sensing mechanism insofar as the parts are actuated by lever 316b. It will be understood that the mechanism shown is duplicated with respect to levers 316c and 316d, and also with respect to lever 316a, with certain exceptions which will be pointed out. However, the reference numerals used in Figs. 12 and 13, and the following description will be given without reference to whether the parts belong to the a, b, c, or d group, except where such designation is material.

The lever 316 is provided with a roller 317 which is engaged by the slide cam 301. A spring 318 biases the lever 316 into the position shown in Fig. 13. The normal position of the parts, however, except during a printing operation, is that shown in Fig. 12. In this position of the parts, the high part of the cam 301 retains the lever 316 in a retracted position.

The rack carriers 325 are slotted so that they may be mounted on slabbed pillars 323 and 324 for sliding movement. Each rack carrier is provided with a downwardly depending portion which is provided with a slot 320 which is adapted to receive a pin 321 carried at the upper end of the lever 316. Thus, when the roller 317 drops off of the high portion of the cam 301, the rack carrier 319 will be advanced until such time as a shoulder 322, which comprises the forward edge of the said depending portion, engages that one of the sensing plungers 308 which projects through the top plate 312.

Also slidably mounted on the slabbed pillars 323 and 324 is a rack 319 which is disposed alongside the rack carrier 325, and toward the observer, as shown in Figs. 12 and 13. That rack 319 which is actuated by a given rack carrier 325 may be spaced from an adjacent pair of rack and carrier by a suitable spacer clip 326. A pin 327 projects from the downwardly extending portion of the rack carrier and is spaced from a pin 328 on the rack 319 so that a spring 329 may be tensioned between them. Thus, the rack is urged forwardly with respect to the rack carrier. Latching means indicated generally by the reference numeral 330, are provided to latch the rack in a position wherein the spring 329 is tensioned, to the end that upon release of the latch, the rack will be advanced toward the front of the machine by a sufficient distance to reverse the type wheel 235 to the extent of one printing position. Movement of the rack and rack carrier from the Fig. 12 position to the Fig. 13 position serves to move the type wheel backwardly, so that the effect of the release of the latch is to move the type wheel backwardly to a greater extent than it would have been if the latch were not released.

The latch comprises a latch plate 331 which is pivotally mounted on a backwardly projecting portion of the rack carrier 325, and which is provided with a bent over lug 332 which rests on the upper edge of the rack 319, but which is adapted to engage a forward facing shoulder 333 formed on said upper edge. Thus, the rack may be latched in a position as shown in Fig. 12, in which the spring 329 is tensioned. Pins 334 and 335 are provided on latch plate 331 and on the rack 325, respectively, and a spring 336 is tensioned between these pins to bias the bent over lug 332 against the upper edge of the rack 325. Thus, if the rack is moved backwardly, which is to the right as shown in Figs. 12 and 13, from its unlatched position, to its Fig. 12 position, the latch plate will drop down and latch the rack into its latched position.

A bent over lug 337 along the under edge of the rack 319 engages a rearwardly facing shoulder 338 on the carrier 325 to limit the forward movement of the rack with respect to the carrier. The rack 319 meshes with gear 236, as shown in Figs. 13 and 14, and as previously indicated in connection with the elapsed time type wheel assembly, means are provided between the assembly which includes type wheel hub 221, type wheel 235 and gear 236 on the one hand, and the electromagnetic means for advancing the same.

The hub 221 is also provided with a cam portion 342 which engages the end 341 of a latch lever 339 which is pivotally mounted on a pillar 340. Displacement of the latch lever 339 by the cam will cause engagement of a bent over lug 343 on the latch plate 331, which serves to release the latch. The motion of the latch plate is limited by a pin 344 which projects from a portion of the carrier 319 into a slot 345 in the latch plate 331.

The single cam portion 342 is disposed between the characters 4 and 5 or, oppositely, between the 9 and zero printing positions of the ten character type wheels; and disposed between the characters zero and 5 on the 10 minute type wheel, which wheel has 12 characters. On this latter type wheel, there are two cam portions 342, oppositely positioned, as also two sets of characters 0 to 5. A six character type wheel could be used, but the present Geneva change gear system would then have to be modified in order to provide sufficient motion to change the six character wheel. The parts are so arranged that the latch lever 339 which is associated with a given rack, is actuated by the rotation of the type wheel of the next lower order, thus in Fig. 13 the hub shown is hub 221b, and the cam portion is 342b, and this engages the latch lever 339c. This latch mechanism is provided for the purpose of "borrowing," that is, when the subtrahend of any given order is greater in magnitude than the minuend, the motion of the rack will cause the type wheel to be rotated in the reverse direction, that is in the counterclockwise direction, as shown in Fig. 13, through the 9 position. Thus the latch lever will be tripped which causes the subtrahend of the next higher order to be increased by 1, and therefore the difference in the next higher order is decreased by 1, which produces the same effect as "borrowing." It will be seen that it is not necessary to provide a latch lever 339a, and in this instance, the rack may be formed directly on the rack carrier 319a, and no latch mechanism is provided.

Means are provided to restore the rack to its latched position. This means comprises a lever 346 which is pivotally mounted on a pillar 347. The lever is provided with a slot 349 through which a pin or pillar 348 extends. A spring 350 is coiled around the hub of the lever, one end of the spring engaging the pillar 348 and the other end engaging a pin 351 which projects from the lever. Thus the lever is biased into its Fig. 13 position. A bent over portion 352 of the lever is adapted to engage a projecting lug 353 which depends from the rack 325 so as to move the rack to the right, as viewed in Figs. 12 and 13, into its latched position, after the rack carrier has returned to its normal position. A pillar 354 also serves to limit the throw of the restoring lever 346. The restoring lever is actuated by a roller 355 which is carried on the lever 316, with the result that as the lever 316 is cammed back into its normal position, the restoring lever 346 will be displaced. If it so happens that the rack has been unlatched during the sensing operation, the rack will automatically be restored to its latched position.

It has been pointed out that each type wheel 235 is rotated selectively by one of two separate driving means, depending upon whether the rotation constitutes the normal minute by minute advance in current time relationship, or whether it constitutes the conditioning which takes place during the sensing operation and just prior to the printing of elapsed time. In the first instance, the driving means comprises the cyclometer unit, the intermediate gears 214, and the perforated gears 230 which are always in mesh. In the second instance, the driving means comprise the racks 325 which mesh with the type wheels only during conditioning. The spring washers 232 provide the necessary slippage between the perforated gears 230 and the type wheels 235 during conditioning, and the cooperation of the click arm 234 and the perforated gear insure that at other times, the printing positions of the type wheels will correspond to the positions of the first driving means.

In order that the rotation of the type wheels during conditioning will not be carried backwardly to the cyclometer unit, and thus destroy their current time setting, means are provided to lock the cyclometer unit, and thus the perforated gears, during conditioning.

This locking means comprises a lock lever 356 suitably pivoted on a shaft 357, journaled in plates 113 and 114. The locking lever is provided with a shaped pin 359 which is adapted to engage the teeth of intermediate gear 214a. The lock lever and the shaped pin are biased into locking position by a spring 358, shown in Figs. 12 and 13. Thus, since the intermediate gear 214a is locked, hub 205a of the cyclometer unit 203 will also be locked, as well as hubs 205b, 205c and 205d, which are driven from hub 205a through the Geneva change pinions 209. When the type wheels 235 and their hubs 221 are rotated backwardly by the racks 325, the click arms 234 will be rotated out of perforations 231, and the position of the latter will remain in correspondence with current time until the completion of the sensing operation.

At all other times, the shaped pin 359 is maintained out of engagement with intermediate gear 214a by means of a pin 360 carried on rack carrier 319a, and which engages the lock lever 356, as shown in Fig. 12. The pin 360 would not appear in the views represented by Figs. 12 and 13, but its position is indicated by dotted lines.

As soon as the rack carrier 319a is moved forwardly, to the zero position, or to any other position, the lock lever 356 is released, and the cyclometer unit 203, the intermittent gear assembly 211, and the perforated gears 230 are locked until such time as the rack carrier is returned to its normal position.

A notch 361 is provided in the upper surface of the latch lever 339 at a point opposite the bent over lug 343 when the rack carrier is in its normal position. Thus, the rotation of the type wheels when they are advanced by the cyclometer unit in current time relationship, and the resulting displacement of the latch lever 339, as the type wheel of the preceding order rotates into the "0" position, will not release the latch.

In the event that a card which has not been punched is inadvertently inserted in the sensing side of the machine, or in the event that one of the punch holes are missing, so that the elapsed time reading would be incorrect, masking means are provided to prevent the printing on the card of the result shown by the type wheels. The masking means comprises a U-shaped member 363, which, as shown in Figs. 12 and 14, is pivotally mounted on the type wheel shaft 222. The rear edge of the connecting portion of this U-shaped member is extended and beaded so that it will be engaged by one or the other of the shoulders 322 of the rack carriers 319. A spring 365 normally biases the U-shaped member so that it clears the type numerals which are in printing position. However, if a punch hole is missing in any order, no sensing pins will project through the card to limit the movement of the rack carrier, and hence the rack carrier will engage the beaded edge 364 and rock the U-shaped member into masking position.

*The card trip mechanism on the punch side*

Means are provided both on the punch side and on the sensing side which are tripped by the insertion of a card so as to initiate a series of operations which cause the punching or sensing of the card, as the case may be, and the printing of the start time, or elapsed time, as the case may be.

Figure 9:
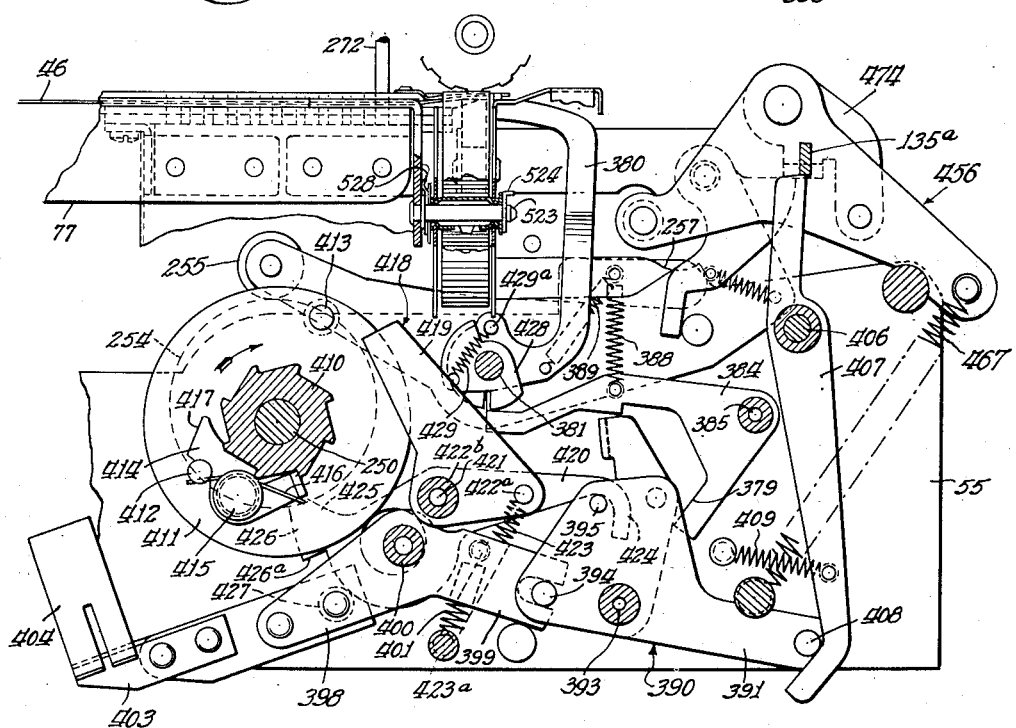
Fig. 9 is a section through the punch side of the mechanism along lines 9—9 of Figs. 3 and 6, showing the card trip mechanism on the punch side.

This trip means for the punch side is shown in elevation as viewed from the right hand side of the machine in Fig. 9. Details of the mechanism are shown in Figs. 32 to 34.

When a card 46 is inserted into the start time opening 43, it is guided into its position by means of the horizontally disposed plate 277 and the die plate 280. As the card is pushed into its home position, the edge of it engages a card lever 380, which is pivotally mounted at 381. The lower portion of the card lever is provided with an arc shaped surface 382, drawn about the pivot 381 as center, and is also provided with a drop surface 383, as shown in Fig. 32. Displacement of the lever 380 by the insertion of the card will cause a displacement of a trip lever 384 which is suitably pivoted at 385. The end of the trip lever is provided with a bent over portion 386 which rides on the arc shaped surface 382 of the card lever. The trip lever is also provided with a shoulder 387 which normally engages a rock assembly 390. A spring 388 biases the trip lever 384 against the arc shaped surface 382, and a spring 389 biases the card lever 380 into its normal position. In operation, the displacement of the card lever and the resulting displacement of the trip lever, will cause the release of the rock assembly 390 which is suitably pivoted on a shaft 393.

The rock assembly as shown in Fig. 32, comprises a pair of plates 391 and 392 which are spaced from each other by pillars 394, 395 and 396. The plate 392 is provided with a bent over lug 397 which is adapted to be engaged by the shoulder 387 of the trip lever.

A switch lever 398 is pivotally mounted on a suitable shaft or arbor 400, and at one end is provided with a forked portion 399 which engages the pillar 394 of the rock assembly 390. Thus, when the rock assembly is released, the switch lever will be rotated in the clockwise direction as viewed in Fig. 9. A spring 401 biases the switch lever in the clockwise direction and into its operated position, and also supplies the force for the displacement of the rock assembly when it is released.

That end of the switch lever which is opposite the forked end 399, carries a switch blade 403 which is adapted to close the circuit between the two resilient contact strips 404 which are mounted on the insulating block 67. The arrangement of the resilient strips 404, and their relationship to the switch blades 403 and 433, is shown in Fig. 36. Suitable conductors 405 (see Fig. 7) serve to connect the resilient strips 404 into a motor circuit, so that displacement of either one of the switch blades 403 or 433 will close the motor circuit to rotate cam shaft 250.

The displacement of the rock assembly 390 also actuates a single revolution clutch for establishing a driving connection between the cam shaft 250 and the hub 253. As shown in Figs. 9 and 11, a ratchet wheel 410 is suitably pinned to the cam shaft 250. Mounted at one end of the hub 253, and adjacent to the ratchet wheel is control disk 411, in which are mounted pins 412 and 413. Pin 412 extends toward the ratchet, whereas pin 413 is mounted on the opposite side of the pawl disk and extends away from the ratchet, as shown in Fig. 11. These pins are disposed substantially opposite to each other, and pin 413 is longer than pin 412.

The control disk also carries a pawl 414 which is suitably mounted on a pin 415, the pawl being provided with a bent over portion which engages the teeth of the ratchet 410. A spring 416 is provided which biases the pawl into engagement with the ratchet.

The tail end of the pawl is provided with a cam surface 417 which is adapted to be engaged by a pawl release assembly 418 to release the driving connection between the control disk and the ratchet. The pawl release assembly, as shown in Fig. 33, comprises a pair of spaced plates 419 and 420 which are pivoted at 421, and are suitably spaced from each other by pillar 422a and hub 422b. A spring 423 extends between pillar 422a and a stud 423a in the frame of the machine.

In Fig. 9 the pawl is shown in its engaged position. As the control disk rotates, a reduced diameter of the pin 413 will engage a cam surface 425 on the plate 420, and will cause the pawl release assembly to be rocked in the counterclockwise direction, as shown in Fig. 9, so that the upper end of plate 419 will project into the path of the cam surface 417, and the pin 412. This latter position of the parts is shown in Fig. 34. Thus, the pawl will be cammed into its released position, and the pin 412 will serve as a stop, preventing any further rotation of the control disk, and its associated parts. The cam shaft and the ratchet being disconnected, may overrun the one revolution. Any tendency for the control disk to rebound is prevented by the pin 413, which, after passing over the point formed between the cam surface 425 and an arcuate surface 426, will permit the spring 423 to rotate the pawl release assembly in the clockwise direction. Thus, the pins 412 and 413 lock the control disk against rotation in either direction, after the pawl has been released.

A tail 424 on the plate 420, when the parts are in normal position, rests on the pillar 395 (as shown in Fig. 7), and thus maintains the pawl release assembly in a position in which the control disk is blocked and the pawl maintained in its released position. When the trip mechanism is actuated by the insertion of the card as pointed out above, the rocking of the rock assembly 390 causes the tail 424 to drop off of the pillar, and the spring 423 then rocks the pawl release assembly in the clockwise direction so as to disengage the pawl and the control disk. Thus, the pawl 414 springs into its engaged position, and establishes a driving connection between the ratchet and the control disk for a single revolution.

An extended pin 427, mounted in the switch lever 398 is engaged by the lower extending edge 426a of plate 420 as shown in Figs. 7, 9 and 34, when the pawl release assembly is rocked into blocking position by the stop pin 413. The motion thus imparted to the switch lever opens the motor circuit. A tail piece 379 on the trip lever 384 is engaged by an extended portion of pillar 396, as the rock assembly is restored to its normal position. This causes the lug 386 to be withdrawn away from the drop surface 383 of the card lever 380, after bent portion 397 of plate 392 in rock assembly 390 has passed edge 387 of trip lever 384.

A mask 428 is mounted on the pivot 381 adjacent the card lever, and is provided with an arcuate edge of slightly greater radius than the arc shaped surface 382 of the card lever. A spring 429 biases the mask in a clockwise direction as shown in Fig. 9, the spring being tensioned between suitable pins projecting from the mask and from the card lever. Thus, the drop surface 383 is automatically covered as soon as the trip lever 384 is restored to its normal position, even though the card 46 is not withdrawn. This arrangement avoids the repetition of a cycle of operation immediately following the cycle just completed, and consequently avoids a double printing impression on the card. When the card is withdrawn and mask 428 swings in a clockwise rotation about pivot 381 by urge of spring 429, an edge of the mask stops against the upper spring pin 429a, which carries spring 429. Thus, when spring 389 urges the card lever 380 in counter-clockwise rotation about pivot 381 to cause the card lever edge which bears against the card to follow the receding card, pin 429a rotates mask 428 in unison with card lever 380 so that its slightly greater radius surface slips over edge 386 of trip lever 384, allowing edge 386 to drop onto the arc-shaped surface 382.

Means are also provided for the storing of an impulse which is received by the electromagnet during the operation of the printing cycle. This means comprises a blocking lever 407, which is mounted on a pivot pin 406 on the center plate 56. A spring 409 biases the blocking lever against a pin 408 which is carried at the end of plate 391 of the rock assembly 390. The lower end of the blocking lever 407 is so shaped that when the rock assembly is latched in its normal position, the upper end of the blocking lever is maintained clear of the path of a lug 135a which projects from the lower corner of plate 135 of the armature 133. This lug moves in a substantially vertical path, and when the armature is in its unoperated position, it blocks the movement of blocking lever 407.

When the rock assembly 390 is released, however, by the insertion of a card, the spring 409 urges the upper end of the blocking lever against the lug 135a. When the electromagnet 130 is energized by the receipt of an impulse, the armature is dropped in the operated position which causes the elevation of lug 135a into the position shown in Fig. 9. This permits the blocking lever 407 to snap into the position shown in that figure in which it blocks the downward movement of lug 135a, and hence the return of the armature to its unoperated position. It has been pointed out above, that the type wheels are advanced as the armature returns from its operated position to its unoperated position, and hence as soon as the armature is blocked in its operated position, the type wheels will not be advanced. Hence, there is no possibility of change in the position of the type wheels during the printing cycle. As soon as the rock assembly 390 is restored to its normal position, at the end of the printing cycle, the pin 408 causes the blocking lever 407 to be displaced out of the path of the lug 135a, with the result that the armature then moves to its unoperated position, and the type wheels are advanced.

*The card trip mechanism on the sensing side*

The card trip mechanism on the sensing side is substantially the same as the card trip mechanism on the punch side. The essential elements are shown in Fig. 8, and include a card lever 430, a trip lever 431, a rock assembly 432, and a switch blade 433 carried on a switch lever 434. These parts operate in the same manner as the corresponding parts 380, 394, 390, 403, and 398, respectively, which have been described in detail. An impulse blocking lever 438 is also provided for engaging the bent over lug 135a on the armature 133 for storing an impulse which is received during the printing cycle. The operation of this impulse blocking lever is substantially the same as that described in connection with the blocking lever 407 on the punch side. Lug 135a cooperates with both blocking levers.

Similarly, the sensing side is provided with a control disk 435 which carries a pawl 436 for engagement with the ratchet 410 on the cam shaft 250. These parts are actuated by a pawl release assembly 437, which operates in the same manner as the pawl release assembly 418, to establish a driving connection between the ratchet 410 and the control disk 435 for a single revolution. The control disk 435 is secured to the sleeve 300, and hence, rotation of the control disk through a single revolution, will cause the rotation of the sensing cams 302 and the slide cams 301, to operate the sensing mechanism in the manner previously described.

It will be observed that the operation of the two card trip mechanisms above described are entirely independent of each other, with the result that either the punch mechanism or the sensing mechanism, together with their associated printing mechanisms, may be operated to the exclusion of the other, depending upon into which opening the card is inserted.

The cam shaft 250 is driven by a motor 440, as shown in Fig. 25. The motor is suitably mounted to a wide lug 48 and is provided with suitable reduction gearing 441, which meshes with and drives a gear 442 which is pinned to the cam shaft 250. As indicated above, the motor circuit is closed either by the insertion of switch blade 403 between one end of the resilient strips 404, or by the insertion of blade 433 between the other end of the resilient strips 434. This occurs during operation of one or the other of the card trip mechanisms, and the motor circuit is maintained closed for approximately the length of time that it takes the cam shaft 250 to make a single revolution. However, due to the provision of the single revolution clutches, the overrun of the motor after the circuit is opened does not affect the operation of the mechanism.

The hammer mechanism on the punch side

The hammer mechanism on the punch side is actuated by the actuating lever assembly 260, which also actuates the punch mechanism as previously described. The hammer mechanism includes a hammer 450, a supporting cradle 456, and a pawl 470 which is mounted on the actuating lever assembly 260 and engages a portion of the cradle. These parts are shown in detail in Figs. 37 and 38, and also in relation to the other parts of the mechanism in Figs. 6 and 7.

The hammer 450 is pivotally mounted on a transversely disposed rod 451 which is supported in the plates 55 and 56. The hammer comprises a pair of arms 452 and 453 which carry at their outer end an impact bar 454 composed of a resilient platen 454a, a backing bar 454b and two plates 454c and 454d, which is adapted to strike the under side of a card at a point just below the type wheels 164. The hammer also includes a hub 455 which is staked to the arms 452 and 453 and which is journaled on the rod 451, the hub and the impact bar serving to space the plates from each and forming a rigid assembly.

Pivotally mounted on the same rod 451 is a cradle 456 which includes a pair of plates 457 and 458 which are spaced from each other by pillars 459, 460 and 461. Staked to the plates are hubs 462 and 463, by means of which the cradle is journaled on the rod 451. The hubs also serve to space the hammer with respect to the cradle. A pillar 464 is also provided for the hammer 450 and a spring 465 is tensioned between pillar 464 and pillar 460. Thus, the hammer rests on and is biased against the pillar 459 of the cradle. The hammer mechanism is designed so as to impart a quick movement in the clockwise direction as viewed in Fig. 38, to the cradle which will cause the hammer 450 to swing up against the type wheels. The motion of the cradle is interrupted short of the printing position of the hammer, by the abutment of the tail portion of the cradle against a pillar 60, as shown in Figs. 7 and 37.

An operating spring 467 is tensioned between pillar 461 of the cradle and a suitable pillar 468 disposed in the lower portion of the mechanism. Thus, it will be seen that when the cradle is displaced against the tension of the operating spring, and then released, the hammer will first be drawn downwardly, and then will be caused to fly upwardly and the momentum of the hammer carries it into printing position even though the rotation of the cradle has been interrupted by the pillar 60.

The means for retracting and releasing the cradle comprises a pawl 470 which, as shown in Fig. 38, is pivotally mounted at 471 on plate 257 of the actuating lever assembly 260. The pawl carries a hardened point 472 which provides a cam surface and a drop. The spring 473 is tensioned between suitable pins on the pawl 470 and the plate 257 to maintain the parts in the position shown in Fig. 38, in which a tail 476 of the pawl lies against the shaft 279. A plate 474 is suitably secured to the hub 462, and is tied to the cradle by means of pillar 460, as shown in Fig. 37. The plate 474 is provided with a horizontally disposed hardened tail piece 475 which projects into the path of the point 472 of the pawl 470. Thus, as the point 472 is caused to move downwardly and to the right as viewed in Fig. 38, when the cam 254 is rotated, the cradle 456 will be withdrawn against the tension of the operating spring 467. As soon as the point 472 slips off of the tail piece 475, the spring will cause operation of the cradle and of the hammer. The spring 465 assists in preventing rebound of the hammer after a printing operation. Thus, a printing operation is caused to take place substantially simultaneously with the punching of a card, and as pointed out previously, this cycle of operation is initiated by the insertion of a card a sufficient distance into the start time opening 43, so that it engages the card lever 380.

The hammer mechanism on the sensing side

The hammer mechanism on the sensing side is disposed at the front portion of the lower half of the sensing side of the machine and is shown in detail in Fig. 21 and also in Figs. 3, 6 and 8. The printing mechanism comprises a hammer 480, a cradle 481, and a cam actuated push bar 482. The hammer is pivoted on a shaft 483 which is mounted in suitable bushings 484 and 485 in flanges 69 and 71 of table 70. The hammer comprises a pair of arms 486 and 487, at the outer end of which is mounted an impact bar 488 of resilient material. A bushing 489 is staked to the inner end of the arms and provides means for journaling the hammer on the shaft 483. These parts, and a pillar 490 serve to space the plates, and to form a rigid hammer construction. A second pillar 491 is provided for the hammer which extends through and beyond the arms 486 and 487, and provides means by which the hammer may be engaged by the cradle 481.

The cradle includes two plates 492 and 493 which are suitably tied together by pillars 494 and 495. Plate 493 is staked on shaft 483 and plate 492 is staked on shaft 483 at the opposite end, so that the cradle is pivotally mounted on the shaft 483. A collar 496 spaces plate 492 from hammer 480. A rebound spring 498 is tensioned between pillars 495 and 490 of the cradle and the hammer respectively to maintain the extended ends of pillar 491 against the upper edges of the cradle plates 492 and 493. These edges may be shaped to conform to the radius of the pillar as shown in Fig. 21. The upward movement of the cradle is interrupted by the hardened collar 75 on the pillar 74, the collar being engaged by depending portions of the cradle plates 492 and 493.

As shown in Figs. 11, 21 and 22, a cam 500 is mounted on a hub 501 for a certain amount of angular movement with respect to the hub. The hub 501 in turn is suitably keyed to the sleeve 300 on the cam shaft 250. As shown in Fig. 22, the cam 500 has an arcuate shaped slot 502, and a pin 503 is mounted in and projects from the hub 501 into slot 502. Thus, the angular motion of the cam with respect to the hub and the sleeve, is limited. The push bar 482 terminates in a yoke portion 504 which encompasses the hub

501, to the end that guiding means are provided for the reciprocation of the push bar. The push bar also has a roller 505 suitably mounted on the side surface thereof so that the roller may be engaged by the cam 500, the surface of the cam as shown in Figs. 21 and 22 being generally spirally shaped, and being provided with a drop-off 506. It will be seen that rotation of the cam 500 in the clockwise direction from the position shown in Fig. 21, will cause displacement of the push bar, and of the cradle 481 to which the push bar is linked at 508. An operating spring 507 is provided between pillar 495 on the cradle and a suitable pin in the depending portion 69 of the plate 70, this operating spring serving to bias the cradle against the hardened collar 75.

In operation, as the sleeve 300 and its associated hub 501 rotate in a clockwise direction, as viewed in Fig. 22, the cam 500 will be dragged by the pin 503, so that the cam is at the counter-clockwise limit of its rotation with respect to the hub 501. At this time, the cradle 481 is being displaced against the tension of the operating spring. When the parts are in the position shown in Fig. 21, the reaction of the roller 505 against the cam will cause the cam to be advanced in the clockwise direction with respect to the sleeve 300 and the hub 501. Thus, the drop of the roller is more abrupt than it would be if the cam were not loosely mounted on the hub. As previously indicated, the drop of the cam causes the release of the cradle 481 and operation of the printing hammer 480, which strikes the under side of the card, the hammer projecting through a slot 510 in table 70, as shown in Fig. 25. This arrangement permits of a very close control of the timing of the printing operation, which control is desirable on the sensing side of the machine, due to the fact that the type wheels are in motion during a portion of the operating cycle, and the printing must be effected prior to the time that the type wheels are caused to return to their normal position.

*The ribbon feed mechanism on the punch side*

The time recorder includes separate inked ribbons for each side of the machine, which ribbons are transversely disposed, and means are provided to advance the ribbons during each printing operation.

In the lower half of the machine, and on the punch side, a driving spool 520 is disposed in the vicinity of the left plate 55, and an idler spool 521 is disposed in about the center of the machine. A ribbon 522 is wound on the idler spool 521 and extends beneath the type wheels 164, 173, 179, and 180, and has its free end secured to and wrapped around the driving spool 520.

The idler spool 521 is mounted on a removable bracket 525 which is shown in Figs. 2, 3 and 9. The lower portion of the bracket is provided with an arbor 523 on which the spool is secured by means of a suitable clip 524. A friction washer 528 disposed between the spool and the bracket, imposes a drag on the spool so that it will not overthrow as the ribbon is advanced. The upper portion of the bracket is bent forwardly, and a suitable thumb screw 526 is disposed therein and is adapted to be threaded into a tapped hole 527 in plate 77, as shown in Fig. 25. Thus, the bracket may be secured in the desired position, but by removal of the thumb screw it may be lifted upwardly, as shown in Figs. 2 and 3, when the top half is opened up, thus permitting the spool to be changed.

The ribbon is guided by a suitable roller 531, (see Figs. 10 and 39) and over a rounded piece 530, the latter being disposed directly above the idler spool, and the former being journaled in brackets 532 and 533, shown in Figs. 4 and 25. The bracket 532 is secured to the flange 79 of table 77, and bracket 533 is secured to plate 55 by means of pillars 534. The edge of the bracket 533 is provided with notches 535 and 536, as shown in Fig. 39.

The driving spool is disposed on a bracket 537 in the form of a plate which is transversely disposed with respect to the machine and journaled on the shaft of the roller 531. Thus, the bracket may be swung outwardly, as shown in Fig. 3, to permit the spool to be removed from a shaft 538 which is mounted in the spool bracket 537. A portion of the outer edge of the plate forming the bracket 537 is bent at right angles, as designated by the reference numeral 539 and viewed in Fig. 39. A leaf spring 540 is mounted on bent edge 539 and carries a detent 541 for engaging one or the other of the notches 535 or 536. As shown in Fig. 39, when the detent engages notch 535 the spool bracket 537 and the driving spool 520 are maintained in operative position. When the spool is to be changed, however, the detent is released and the spool bracket pivoted upwardly until the detent drops into notch 536.

The shaft 538 is suitably journaled in the spool bracket, and extends through the same so that on the opposite side of the bracket from that side on which the driving spool is mounted, a ratchet wheel 543 may be secured. A pawl plate 544 is rotatably journaled on shaft 538, and carries pawl 545 which engages the ratchet wheel 543 to actuate the same. A retaining pawl 549 is also provided to prevent reverse rotation of the ratchet wheel and driving spool, as shown in Fig. 39. This pawl is formed in an upward extension of leaf spring 540. A pin 546 is secured to the pawl plate 544 and extends inwardly so that it may be engaged by a ribbon feed lever 547, which, as shown in Fig. 6, is rotatably mounted on shaft 550. The ribbon feed lever is provided with a bail 548 which rests on the upper edge of plate 258 of the actuating lever assembly 260. Thus, every time that the actuating lever is raised by the cam 254 to tension the printing hammer 440, and to operate the punching mechanism, the ribbon is advanced. Inasmuch as the printing takes place at the top of the cam rise, the ribbon is not moving when the hammer strikes the card.

*The ribbon feed mechanism on the sensing side*

The ribbon mechanism on the sensing side includes a driving spool 560, an idler spool 561, and a ribbon 562 which runs from one to the other and is disposed beneath the type wheels and above the slot 510.

The idler spool is mounted on a bracket 563 shown in Fig. 25, which depends from the under side of plate 77. A clip 565 secures the idler spool to an arbor 564 which projects from the bracket 563, as shown in Figs. 3, 6 and 7, and a spring washer 566 is disposed between the spool and the bracket. The ribbon 562 passes over suitable rollers, 562a and 562b (Figs. 5, 7 and 32), to the driving spool 560, roller 562b being mounted in brackets 567 and 568, shown in Fig. 25. The manner in which the driving spool is mounted is substantially the same as that described with respect to the driving spool on the punch side, and will not be described again in detail. As shown in Fig. 3, it includes a spool bracket 569 which is pivotally mounted on the roller shaft, and a detent 570 which is adapted to engage in notches 571 and 572 to maintain the driving spool and its bracket either in operative position, or in a position which permits removal of the spool. A ratchet wheel 573 is mounted on the opposite side of the bracket 569 from the driving spool 560, both being keyed to a shaft 574. A pawl plate 575 is rotatably journaled on the shaft 574 and carries a pawl 576 for rotation on the ratchet wheel and the spool. A suitable retaining pawl, 576a, is provided. A pin 577 extends inwardly from the pawl plate and is engaged by the forked end of a ribbon drive bell crank 578, the latter element being shown in Figs. 6 and 8. This bell crank is actuated by a pin 579 which engages the opposite forked end of the bell crank, the pin projecting from the plate 492 of the cradle 481. These parts are also shown in Fig. 6. In operation, the retraction of the cradle preparatory to the printing operation, advances the ratchet wheel 573 and the driving spool 560, and the ribbon is stationary at the time of printing.

*The card block means*

Means are provided to prevent the reinstertion of a card into the start time opening 43, if the card has previously been punched. These means comprise an additional punch 580 which is actuated by the punch lever assembly 263, to punch the block hole 50 in the card 46 whenever the card is also punched with the time holes 49. A blocking pawl 585 is provided which is adapted to bear against the card as it is being inserted, and which will drop into the block hole 50 to prevent movement of the card into such a position that it will trip the card lever 380. These parts are shown in Figs. 4, 17, 20 and 29.

As shown in Fig. 20, the punch 580 is pivotally mounted to the plate 264 of the punch lever assembly 263 by means of a screw 582. A guide pin 583 is mounted in plate 102 and passes through a suitable slot in the punch 580 to guide the punch in its operation. The lower portion of the punch passes through a suitable aperture in the horizontally disposed plate 277, and cooperates with a hole 581 in the die plate 280 to punch a hole of substantial dimensions. This punching operation takes place simultaneously with the punching of the time holes 49.

The blocking pawl 585, as shown in Figs. 17, 20 and 29, is formed at the end of a lever 587, which lever is pivoted on a short pillar 584 which extends between left plate 100 and partial subplate 103. The operation of the blocking pawl 585 is controlled by a control pawl 586 which is also pivotally mounted on the short pillar 584, and is provided with an extension 588 which is positioned adjacent the lever 587. The horizontally disposed plate 277 and the die plate 280 are suitably apertured to permit operation of these two pawls, and pawl 585 is aligned with the punch 580.

A pin 589 projects from a portion of the lever 587 above the blocking pawl 585 and a spring 591 is tensioned between pin 589 and a correspondingly positioned pin 590 in lever extension 588. Thus, the blocking pawl is urged downwardly with respect to the extension 588 of the control pawl. However, a slot 593 in the blocking pawl limits the amount of movement of the parts with respect to each other, with the result that when the control pawl and extension are rocked in a counterclockwise direction, as shown in Fig. 20, by means of spring 592, the blocking pawl will be entirely clear of the card, and the control pawl 586 will project into the space between the plates 277 and 280. When a card 46 that has previously been punched is inserted into the start time opening, as soon as the leading edge of the card engages the control pawl 586, the parts will be rocked into the position shown in Fig. 20, with the result that the blocking pawl 585 enters into the hole 50 of the card and blocks further movement of the card and prevents consequent operation of the machine. The cam surface on the lower portion of the blocking lever, together with its spring mounting, permits withdrawal of the card.

If the card 46 has not been previously punched, even though the control pawl 586 is rocked in the clockwise direction, the resilient mounting of the blocking pawl 585 merely causes the pawl to be urged against the card, but does not impede further insertion of the card. Thus, a card which has once been punched, cannot be punched again.

*Resume of operation*

The operation of the various portions and assemblies of the time recorder have been described in detail in connection with the description of said parts and subassemblies. In general, the card may be inserted either in the start time opening 43 or the elapsed time opening 44. If a blank card inadvertently is first inserted in the elapsed time opening 44, the operation of the mask 363 will prevent anything from being printed on the card, even though the printing cycle takes place. If an already punched card is inadvertently inserted in the start time opening 43, the card blocking means, including the blocking pawl 585, will prevent the printing operation from taking place, as described above. Except under the two situations referred to, the insertion of a card in either the start time opening 43, or the elapsed time opening 44, will cause only the mechanism on the corresponding side of the machine to be operated. This is for the reason that, although the insertion of either one of the above cards will close the motor circuit, there are separate driving connections between the cam shaft 250 and the sleeves 253 and 300, and only one of these driving connections is established by the insertion of a card in any given opening.

The rotation of the cam 254, pursuant to the insertion of a card into the start time opening, will cause operation of the actuating lever assembly 260, which actuates both the punch mechanism and the hammer mechanism on the punch side. The position of the punch slides *a, b, c* and *d*, at all times correspond to the printing positions of the hour and minute type wheels 164a, 164b, 164c and 164d. This is for the reason that each time the electromagnet 130 is energized, and then deenergized, the slide 211a is advanced at the same time that the type wheel 164a is advanced. In addition to punching the time holes 49 in the card, the punch lever assembly 263 has associated with it the punch 580 which punches the block hole 50 in the card, thus providing means for preventing the reinsertion of the card in the start time opening as pointed out above.

When a card is inserted into the elapsed time opening 44, the ensuing cycle of operation is actuated by three sets of cams, namely cams 302 which actuate the sensing head 304, cams 301 which actuate the rack carriers 319, and cam 500 which actuates the hammer 480.

The cycle of operation of the sensing mechanism is initiated by the insertion of a card which displaces card lever 430, thus closing the motor circuit and establishing a driving connection between the sleeve 300 and the shaft 250 for a single revolution. The three sets of cams are so shaped and timed that the cycle of operation is substantially that shown in Fig. 23. Thus, the cams 302 first cause the rise of the sensing unit, and during the dwell of the sensing unit the rack carriers condition the type wheels, that is, cause the subtracting operation to take place, while at the same time the cam 500 tensions the hammer. The ribbon also feeds during this time. The borrowing takes place during the conditioning of the type wheels, immediately after the displacement of the rack carriers into engagement with their respective sensing plungers 308. After the type wheels are conditioned and the parts at rest, the drop of the cam 500 occurs which releases the hammer and causes a printing operation. Thereafter, the rack carriers are retracted, the borrowing springs are latched, and the sensing unit drops. After the parts are in their normal position, the pawl 436 is released, and the motor circuit opened, this taking place at about 350 degrees of the timing cycle shown in Fig. 23. Thus, the elapsed time is printed on the card, the elapsed time being determined by the means previously described which are provided to rotate the type wheels backwardly by an amount determined by the sensing of the holes which are punched in start time relationship.

The housing 40 may be secured or locked to the base by any suitable means, as indicated in Fig. 1, and the hinged arrangement makes for easy access to the parts of the machine after the cover has been removed. Specifically, it enables the ribbons to be changed or reversed, it enables resetting of the month and year type wheels, and it permits cleaning and repair of the mechanism. The hinge rod 86 is removable so that the top half of the machine may be entirely removed for inspection and repair. As shown in Fig. 10, on the punch side of the upper half, a latch 600 is pivotally mounted on the left plate 100. A latch spring 601 biases the latch into latched position with respect to a latch plate 602 mounted on the table 71. As shown in Fig. 2, a similar latch 603 and latch spring 604 cooperate with a latch plate 605 mounted on table 70. Thus, the parts may be latched in the closed position in order that the position of the top and bottom halves may be fixed during operation of the machine, but the latches being readily operable to permit the opening of the machine as shown in Fig. 2.

There are relatively few operating connections between the top and the bottom halves, and these operating connections are such as to permit the opening of the machine. For instance, slides 143 and 190 which actuate the two type wheel assemblies, are hooked over the extended portion of the spacer 142 of the armature 133, in a manner which permits the opening of the machine. Similarly, the engagement of the punch lever assembly 263 with the actuating lever assembly 260 is effected by the mounting of the roller 269 on punch lever assembly which extends into the path of the arcuate edge 261 on the actuating lever assembly, the roller 269 in the open position being shown in Fig. 2. On the sensing side the levers 316 engage the rack carriers 319 by means of a pin and slot arrangement, the pin 321 and the slot 320 being shown in Fig. 2. Also the engagement of the restoring lever 346 with the projecting lug 353 of the rack carrier 319 is such that the top may be opened up as shown in Fig. 2. In other words, all of the operating connections mentioned could be characterized as releasable connections.

The time recorder herein described, instead of being controlled by a remotely disposed master clock, may be controlled by a synchronous electric motor disposed within the housing which, through suitable cam operated contacts, will provide the periodic impulses for energizing the electromagnet 130. In the alternative, a synchronous motor may operate directly the slides 143 and 190.

It has been pointed out that the start time and elapsed time type wheel assemblies operate on a twenty-hour daily cycle, at the end of which the date type wheels are automatically advanced. The usual program instrument is provided to cut out the additional four hours.

In the alternative, the type wheel assemblies may be designed to operate on a weekly cycle in which the hours are cumulated from one day to the next. Thus, it is not necessary to record the closing time every day on a job that may run over into several days. For instance, a 40 hour weekly cycle may be provided in which the date wheel is automatically advanced every eight hours, and the additional sixteen hours of each day are cut out. Or, a 60 hour cycle made up of six ten hour days may be provided. In these instances, the date wheel must be advanced manually at the beginning of each week to compensate for the two or one days, respectively, during which the recorder is cut out in the 40 and 60 hour weekly cycles above mentioned.

In the event that the type wheel assemblies are designed to operate on a twenty-four hour daily cycle, of course no program instrument is necessary.

Other possible variations in the type wheel assembly design include recording in "apparent" hundredths of an hour, for facilitating pay roll extensions, rather than in minutes. Thus, 9:30, 9:31, 9:32 and 9:33 would be recorded as 9:50, 9:52, 9:53 and 9:55 respectively. This means, for example, that the type wheel 164-b would be provided with ten printing positions and be advanced every sixth minute, rather than the twelve printing positions and ten minute periodic advance described herein. Conversely, the type wheel 164-a instead of having ten printing positions, would have 12 printing positions comprising two series of characters as follows: 0, 2, 3, 5, 7, 8. To record "actual" hundredths, the type wheels 164-a and 164-b, for example, would each have ten printing positions, but a master clock or synchronous unit which transmitted impulses every thirty-six seconds would be required.

Although only a preferred embodiment of my invention has been shown and described herein, it will be understood that various modifications and changes may be made in the construction shown without departing from the spirit of my invention, as defined in the appended claims.

I claim:

1. A time recorder comprising a set of type wheels, means for guiding a card into cooperative position adjacent said type wheels, means displaced by said card when in said cooperative position, a motor, a motor circuit therefor, a control member for said motor circuit movable between a closed circuit position and an open circuit position, latch means for said control member for maintaining said control member in said open circuit position, said latch means being actuated by the displacement of said displaceable means to release said control member to permit said control member to move into closed circuit position, a rotatable element adapted to be driven by said motor, means for establishing a driving connection between said motor and said rotatable element for a single revolution of said rotatable element, impression means actuated by said rotatable element and cooperating with said type wheels and said card when the latter is in said cooperative position to record the angular position of said type wheels on said card, and means actuated by the release of said control member for actuating said connection establishing means.

2. A time recorder according to claim 1 having means for restoring said control member to open circuit position after actuation of said impression means.

3. A time recorder according to claim 1 in which said displaceable member includes a cam having a drop face, and in which said latch means is provided with a cam engaging portion which is biased into engagement with said cam, means for restoring said control member to open circuit position after operation of said connection establishing means, said latch means having a portion adapted to be engaged by said control member as it is being restored to open circuit position to displace said cam engaging portion away from said cam, and means to maintain said cam engaging portion in its displaced position until such time as said displaceable means is also restored to its normal position and is again displaced by the reinsertion of a card, thereby preventing a second operation of said impression means on the same card.

4. A time recorder according to claim 1 in which said displaceable member includes a cam having a drop face, and in which said latch means is provided with a cam engaging portion which is biased into engagement with said cam, a displaceable mask adapted to cover said drop face, and having a portion adapted to be engaged by said cam engaging portion when said displaceable member is initially displaced to displace said mask and to expose said cam face, thereby permitting operation of said latch means and release of said control member, means biasing said mask into covered position, means for automatically restoring said control member to open circuit position after operation of said connection establishing means, said latch means having a portion adapted to be engaged by said control member as it is being restored to open circuit position to displace said cam engaging portion away from said cam and said mask, whereby said mask will be restored to covered position and will prevent the cam engaging portion of said latch means from being again displaced into control member releasing position even though said card maintains said displaceable means in displaced position, thereby preventing a second operation of said impression means.

5. A time recorder according to claim 1 wherein said connection establishing means includes a pawl and ratchet mechanism, the pawl being biased into engagement with the ratchet, and wherein said actuating means for said connecting establishing means includes a rock member adapted to bear against said pawl to maintain said pawl out of engagement with said ratchet, and having a portion engaging said control member when the latter is in open circuit position, in combination with means biasing said rock member away from said pawl and into engagement with said control member when in open circuit position whereby said control member normally maintains said rock member in engagement with said pawl, but movement of said control member into closed circuit position releases said rock member and permits it to move out of engagement with said pawl, thereby establishing a driving connection between said motor and said rotatable shaft.

6. A time recorder according to claim 1 adapted to receive a punched card and to record elapsed time thereon which includes a displaceable means for sensing said punched card, and means controlled by the operation of said sensing means for rotating said type wheels to differential extents dependent upon the location of the holes punched in said card, both of said means being actuated by said rotatable element in timed relationship with the actuation of said impression means.

7. A time recorder according to claim 1 adapted to receive a punched card and to record elapsed time thereon which includes a displaceable sensing head having a plurality of extendible plungers for sensing said punched card, a plurality of racks for rotating said type wheels to differential extents dependent upon the location of the holes punched in said card, said sensing head and said racks being actuated by said rotatable element in timed relationship with the actuation of said impression means whereby said sensing head will first be displaced into operative position, said racks will then be displaced into engagement with the extended plungers of said sensing head to rotate said type wheels, and said impression means will then be actuated.

8. A time recorder comprising a set of type wheels, means for guiding a card into cooperative position adjacent said type wheels, a motor, a motor circuit therefor, a movable contact member in said motor circuit, a control member engaging said movable contact member and urged thereby into operative position, means biasing said control member and said movable contact member into closed circuit position, means for maintaining said control member and said movable contact member in open circuit position, and adapted to be displaced by said card when inserted into said cooperative position, to release said control member to permit said control and contact members to move into closed circuit position, a rotatable element adapted to be driven by said motor, a single revolution clutch between said rotatable element and said motor, a printing hammer actuated by said rotatable element and cooperating with said type wheels and said card when the latter is in said cooperative position to record the angular position of said type wheels.

9. In a time recorder having a motor, a motor circuit therefor, recording means, and a pawl and ratchet mechanism for establishing a driving connection between said motor and said recording means, the ratchet being rotatable with said motor, the combination of a control disk disposed adjacent said ratchet and mounted for rotation independently thereof, said pawl being mounted on said control disk and biased into engagement with said ratchet, a pawl release assembly displaceable into a blocking position in which position a portion thereof blocks rotation of said control disk and engages said pawl to maintain the same out of engagement with said ratchet, and biased into a non blocking position in which said pawl engages said ratchet and said control disk is free to rotate, a rock assembly adapted to be displaced from a normal position and having a portion engaging said pawl release assembly to maintain the same in blocking position when said rock assembly is maintained in normal position, the arrangement being such that displacement of said rock assembly from normal position will release said pawl release assembly to permit movement thereof into non-blocking position and consequent rotation of said control disk by the engagement of said pawl with said ratchet, and means on said control disk for engaging said pawl release assembly to rock the same into blocking position after said control disk has rotated through approximately one revolution, said rock assembly including means operable to close said motor circuit when said rock assembly is displaced, and said rock assembly having another portion extending into the path of said pawl release assembly and being adapted to be engaged by said pawl release assembly when the latter is rocked into said blocking position whereby said motor circuit may be opened and whereby said rock assembly may be restored to normal position wherein return movement of said pawl release assembly into non-blocking position is prevented.

10. In a time recorder having a time train and printing mechanism, an electromagnet adapted to be periodically energized, an armature disposed in cooperative relationship to said electromagnet and biased into unoperated position, pawl and ratchet mechanism driven by said armature and adapted to advance said time train as said armature moves from operated position into unoperated position, card trip means including a rock assembly adapted to be released by the insertion of a card in said recorder to actuate said printing mechanism, and a blocking lever biased against a portion of said armature when said armature is in unoperated position so as to permit movement of said armature into operated position, but serving to block the return movement thereof from operated into unoperated position, and to prevent the consequent advance of said time train, said blocking lever being engaged by said rock assembly when in normal position so as to be maintained clear of the path of said armature portion, whereby release of said rock assembly will not impede the movement of said armature into operated position but will maintain the same in stressed position during the actuation of said printing mechanism and will delay the advance of said type wheels until restoration of said rock assembly to normal position.

11. In a time recorder having cyclically operating driving means, a type wheel, means controlled by said cyclically operating driving means for conditioning said type wheel and a pivotally mounted printing hammer for cooperation with said type wheel when conditioned, the combination of a pivotally mounted cradle for actuating said hammer, a link connected to said cradle, a shaft forming part of said driving means, a cam mounted on said shaft for limited rotation with respect thereto, said link terminating in a yoke portion embracing said shaft adjacent said cam, a cam roller journaled on said link for engagement by said cam and means biasing said link and said cam roller against said cam, said cam having a drop surface whereby reaction of said cam roller against said displaced surface will cause said cam to be advanced with respect to said shaft to accelerate the drop of said cam.

12. An elapsed time recorder comprising a displaceable sensing head including a plurality of extensible sensing plungers adapted selectively to penetrate a perforation in a record card when said sensing head is displaced; sliding means including a rack carrier and a rack member; operating means to displace said sliding means into engagement with that one of said sensing plungers which is extended; a type wheel; a time train for driving said type wheel in a forward direction; releaseable driving means between said type wheel and said time train; means disposed in driving relation with said type wheel including a gear adapted to be engaged by said rack member when said sliding means is displaced to rotate said type wheel in the reverse direction; means for slidably mounting said rack member on said rack carrier to permit longitudinal sliding movement sufficient to rotate said type wheel through one printing position; a second type wheel mounted adjacent said first mentioned type wheel and provided with a plurality of printing positions including a zero position; means actuated by said second type wheel as it rotates into said zero position for shifting said rack member with respect to said rack carrier; and means to displace said sensing head into operating position in timed relation to the operation of said operating means whereby said sensing head will be maintained in displaced position during the displacement of said sliding means.

13. An elapsed time recorder comprising a displaceable sensing head including a plurality of extensible sensing plungers adapted selectively to penetrate a perforation in a record card when said sensing head is displaced; sliding means including a rack carrier and a rack member; operating means to displace said sliding means into engagement with that one of said sensing plungers which is extended; a type wheel; a time train for driving said type wheel in a forward direction; releaseable driving means between said type wheel and said time train; means disposed in driving relation with said type wheel including a gear adapted to be engaged by said rack member when said sliding means is displaced to rotate said type wheel in the reverse direction; means for slidably mounting said rack member on said rack carrier to permit longitudinal sliding movement sufficient to rotate said type wheel through one printing position; means biasing said rack member in a direction to produce reverse movement of said type wheel; latching means to retain said rack member in a normal position in which said biasing means is stressed; a second type wheel mounted adjacent said first mentioned type wheel and provided with a plurality of printing positions including a zero position; means actuated by said second type wheel as it rotates into said zero position for releasing said latch whereby said rack member causes rotation of said type wheel in the reverse direction through one printing position; means to render said latching means inoperative when said sliding means is in normal position; and means to displace said sensing head into operating position in timed relation to the operation of said operating means whereby said sensing head will be maintained in displaced position during the displacement of said sliding means.

14. An elapsed time recorder comprising a displaceable sensing head including a plurality of extensible sensing plungers adapted selectively to penetrate a perforation in a record card when said sensing head is displaced; sliding means including a rack carrier and a rack member; operating means to displace said sliding means into engagement with that one of said sensing plungers which is extended; a type wheel; a time train for driving said type wheel in a forward direction; releaseable driving means between said type wheel and said time train; means disposed in driving relation with said type wheel including a gear adapted to be engaged by said rack member when said sliding means is displaced to rotate said type wheel in the reverse direction; means for slidably mounting said rack member on said rack carrier to permit longitudinal sliding movement sufficient to rotate said type wheel through one printing position; means biasing said rack member in a direction to produce reverse movement of said type wheel; latching means to retain said rack member in a normal position in which said biasing means is stressed; a second type wheel mounted adjacent said first mentioned type wheel and provided with a plurality of printing positions including a zero position; means actuated by said type wheel as it rotates through said zero position for releasing said latch whereby said rack member causes rotation of said type wheel in the reverse direction into a position beyond that position which is normally determined by the engagement of said stop face with said extended plunger; means to render said latching means inoperative when said sliding carrier is in normal position, means actuated by said operating means as it returns said sliding means to normal position for displacing said rack member into its latched normal position; and means to displace said sensing head into operating position in timed relation to the operation of said operating means whereby said sensing head will be maintained in displaced position during the displacement of said sliding means.

15. An elapsed time recorder comprising a displaceable sensing head including a plurality of extensible sensing plungers adapted selectively to penetrate a perforation in a record card when said sensing head is displaced; sliding means; operating means to displace said sliding means into engagement with that one of said sensing plungers which is extended; a type wheel; a time train for driving said type wheel in a forward direction; releaseable driving means between said type wheel and said time train; means disposed in driving relation with said type wheel and adapted to be engaged when said sliding means is displaced to rotate said type wheel in the reverse direction; means to displace said sensing head into operating position in timed relation to the operation of said operating means whereby said sensing head will be maintained in displaced position during the displacement of said sliding means; a mask for said type wheel, adapted when in operative position, to render the same inoperative; and means biasing said mask into inoperative position, said mask having a portion disposed in the path of said sliding means at a position beyond said sensing head and adapted to be engaged by said sliding means to displace the mask into operative position, whereby said type wheel will be rendered inoperative upon operation of the recorder at such time as an unperforated record card is positioned in cooperative position with said sensing head.

16. An elapsed time recorder comprising a displaceable sensing head including a plurality of extensible sensing plungers adapted selectively to penetrate a perforation in a record card when said sensing head is displaced; sliding means; operating means to displace said sliding means into engagement with that one of said sensing plungers which is extended; a type wheel; a time train for driving said type wheel in a forward direction; releaseable driving means between said type wheel and said time train; means disposed in driving relation with said type wheel; and adapted to be engaged when said sliding means is displaced to rotate said type wheel in the reverse direction; means to displace said sensing head into operating position in timed relation to the operation of said operating means whereby said sensing head will be maintained in displaced position during the displacement of said sliding means; a lower frame member; an upper frame member; and means providing a hinged connection between said two frame members, said sensing head and said operating means being disposed in said lower frame member, and said sliding means being disposed in said upper frame member, said sliding means including a slotted member, and said operating means including a pin extending into the slot of said slotted member, the arrangement being such that said operating means may be disengaged from said sliding member when said upper frame member is rotated away from said lower frame member.

17. An elapsed time recorder comprising a displaceable sensing head including a plurality of extensible sensing plungers adapted selectively to penetrate a perforation in a record card when said sensing head is displaced; sliding means including a rack carrier and a rack member; operating means to displace said sliding means into engagement with that one of said sensing plungers which is extended; a type wheel; a time train for driving said type wheel in a forward direction; releasable driving means between said type wheel and said time train; means disposed in driving relation with said type wheel including a gear adapted to be engaged by said rack member when said sliding means is displaced to rotate said type wheel in the reverse direction; means for slidably mounting said rack member on said rack carrier to permit longitudinal sliding movement sufficient to rotate said type wheel through one printing position, means biasing said rack member in a direction to produce reverse movement of said type wheel, a latch plate mounted on said rack carrier and adapted to engage said rack member to maintain the same in a normal position in which said biasing means is stressed, a latch lever mounted adjacent said rack carrier and having a portion disposed substantially parallel to the path of a cooperating portion of said latch plate as it moves through a series of positions with said rack carrier, a second type wheel mounted adjacent said first mentioned type wheel and provided with a plurality of printing positions including a zero position, a cam on said second type wheel for engaging said latch lever and displacing the same so as to engage said latch plate and to release said rack member whereby said first type wheel will be rotated in the reverse direction through one printing position; and means to displace said sensing head into operating position in timed relation to the operation of said operating means whereby said sensing head will be maintained in displaced position during the displacement of said sliding means.

18. An elapsed time recorder comprising a displaceable sensing head including a plurality of extensible sensing plungers adapted selectively to penetrate a perforation in a record card when said sensing head is displaced; sliding means; operating means to displace said sliding means into engagement with that one of said sensing plungers which is extended; a shaft; a type wheel rotatably mounted on said shaft; a time driven gear rotatably mounted on said shaft; a spring biased member connected to said type wheel and frictionally engaging said time driven gear to transmit motion from said gear to said type wheel to drive said type wheel in a forward direction; means disposed in driving relation with said type wheel and adapted to be engaged when said sliding means is displaced to rotate said type wheel in the reverse direction with said spring biased member remaining stationary and slipping on said type wheel; and means to displace said sensing head into operating position in timed relation to the operation of said operating means whereby said sensing head will be maintained in displaced position during the displacement of said sliding means.

RICHARD L. LORENZ.

REFERENCES CITED

The following references are of record in the file of this patent:

UNITED STATES PATENTS

| Number | Name | Date |
|---|---|---|
| 1,184,721 | Bryce | May 30, 1916 |
| 1,186,541 | Bryce | June 13, 1916 |
| 1,190,217 | Bryce | July 4, 1916 |
| 1,205,082 | Bryce | Nov. 14, 1916 |
| 1,226,058 | Bryce | May 15, 1917 |
| 1,228,290 | Bryce | May 29, 1917 |
| 1,231,108 | Zesbaugh | June 26, 1917 |
| 1,260,705 | Pierce | Mar. 26, 1918 |
| 1,267,510 | Bryce | May 28, 1918 |
| 1,558,743 | Merriman | Oct. 27, 1925 |